US011243736B2

(12) United States Patent
Kwahk et al.

(10) Patent No.: US 11,243,736 B2
(45) Date of Patent: Feb. 8, 2022

(54) CONTENT BROADCAST METHOD AND DEVICE ADOPTING SAME

(71) Applicant: Samsung Electronics Co., Ltd., Gyeonggi-do (KR)

(72) Inventors: Ji-young Kwahk, Gyeonggi-do (KR); Giang-yoon Kwon, Seoul (KR); Jin-young Jeon, Seoul (KR); Sang-woong Hwang, Gyeonggi-do (KR); Jee-sun Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 15/425,465

(22) Filed: Feb. 6, 2017

(65) Prior Publication Data
US 2017/0147278 A1 May 25, 2017

Related U.S. Application Data

(63) Continuation of application No. 13/377,427, filed as application No. PCT/KR2010/003602 on Jun. 4, 2010, now abandoned.

(30) Foreign Application Priority Data

Jun. 9, 2009 (KR) .................. 10-2009-0051054
Oct. 30, 2009 (KR) .................. 10-2009-0104341

(51) Int. Cl.
*G06F 16/30* (2019.01)
*G06F 3/14* (2006.01)
(Continued)

(52) U.S. Cl.
CPC .......... *G06F 3/1454* (2013.01); *G06F 3/0481* (2013.01); *G06F 3/04817* (2013.01);
(Continued)

(58) Field of Classification Search
CPC ......... G06F 3/1454; G06F 2203/04803; G06F 3/0481; G06F 3/04817; G06F 3/04842;
(Continued)

(56) References Cited

U.S. PATENT DOCUMENTS 6,579,324 B1 * 6/2003 Lowry ................... G06F 40/18
715/243
2002/0167484 A1 11/2002 Hatanaka et al.
(Continued)

FOREIGN PATENT DOCUMENTS

KR   1020080065216   7/2008
WO   WO 2008/021236   2/2008

OTHER PUBLICATIONS

Article entitled "Impromptu: A New Interaction Framework for Supporting Collaboration in Multiple Display Environments and Its Field Evaluation for Co-located Software Development", by Biehl et al., dated Apr. 10, 2008 (Year: 2008).*
(Continued)

Primary Examiner — Mahesh H Dwivedi
(74) Attorney, Agent, or Firm — Sughrue Mion, PLLC

(57) ABSTRACT

A method for broadcasting contents and a device using the same are provided. The method for broadcasting contents includes displaying a host content window in which a first content is displayed, and displaying an application window in which a second content is displayed, the second content being provided by an application which is executed in the device, where only the first content among the first content and the second content is broadcast to an external device connected to the device.

17 Claims, 26 Drawing Sheets

(51) Int. Cl.
   *H04N 21/478* (2011.01)
   *H04N 21/4363* (2011.01)
   *H04N 21/482* (2011.01)
   *H04N 21/436* (2011.01)
   *H04N 21/414* (2011.01)
   *H04N 21/431* (2011.01)
   *H04N 21/4788* (2011.01)
   *H04N 21/47* (2011.01)
   *G06F 3/0481* (2013.01)
   *G06F 3/0484* (2013.01)
   *G09G 5/00* (2006.01)

(52) U.S. Cl.
   CPC ..... *G06F 3/04842* (2013.01); *H04N 21/41407* (2013.01); *H04N 21/436* (2013.01); *H04N 21/4312* (2013.01); *H04N 21/43637* (2013.01); *H04N 21/47* (2013.01); *H04N 21/478* (2013.01); *H04N 21/4788* (2013.01); *H04N 21/482* (2013.01); *G06F 2203/04803* (2013.01); *G09G 5/00* (2013.01)

(58) Field of Classification Search
   CPC ............... G09G 5/00; H04N 21/41407; H04N 21/4312; H04N 21/4316; H04N 21/436; H04N 21/43637; H04N 21/47; H04N 21/478; H04N 21/4788; H04N 21/482
   See application file for complete search history.

(56) References Cited

U.S. PATENT DOCUMENTS

| | | | |
|---|---|---|---|
| 2003/0105816 A1* | 6/2003 | Goswami | G06Q 10/10 709/204 |
| 2006/0002315 A1 | 1/2006 | Theurer et al. | |
| 2006/0064724 A1 | 3/2006 | Kwon et al. | |
| 2007/0028262 A1 | 2/2007 | Bucher et al. | |
| 2007/0033238 A1* | 2/2007 | Rosenbush | G06F 16/178 |
| 2007/0195008 A1 | 8/2007 | Ueno et al. | |
| 2007/0204047 A1 | 8/2007 | Parker et al. | |
| 2007/0276925 A1 | 11/2007 | La Joie et al. | |
| 2008/0016156 A1* | 1/2008 | Miceli | G06Q 10/10 709/204 |
| 2008/0065996 A1 | 3/2008 | Noel et al. | |
| 2008/0126943 A1 | 5/2008 | Parasnis et al. | |
| 2008/0207137 A1 | 8/2008 | Maharajh et al. | |
| 2009/0157608 A1* | 6/2009 | Strathearn | G06F 16/40 |
| 2009/0217177 A1* | 8/2009 | DeGrazia | G06F 3/0481 715/753 |
| 2009/0249244 A1* | 10/2009 | Robinson | G06F 3/0481 715/781 |
| 2009/0300139 A1 | 12/2009 | Shoemaker et al. | |
| 2010/0169269 A1* | 7/2010 | Chandrasekaran | G06F 16/176 707/608 |
| 2010/0260209 A1* | 10/2010 | Choi | H04N 21/42203 370/542 |
| 2013/0132862 A1* | 5/2013 | Noel | G06F 3/0481 715/753 |
| 2014/0087780 A1* | 3/2014 | Abhyanker | G06Q 50/01 455/521 |

OTHER PUBLICATIONS

Article entitled "Evaluating and Implementing a Collaborative Office Document System", by Adler et al., dated Dec. 7, 2005 (Year: 2005).*

Article entitled "Leveraging Single-user Applications for Multi-user Collaboration: the CoWord Approach", by Xia et al., dated Nov. 10, 2004 (Year: 2004).*

Article entitled "Transparent Adaptation of Single-User Applications for Multi-User Real-Time Collaboration", by Sun et al., dated Dec. 2006 (Year: 2006).*

European Search Report dated May 28, 2015 issued in counterpart application No. 10786326.8-1904.

Korean Office Action dated Aug. 19, 2015 issued in counterpart application No. 10-2009-0104341.

* cited by examiner

CONTENT BROADCAST METHOD AND DEVICE ADOPTING SAME

PRIORITY

This application is a continuation of U.S. patent application Ser. No. 13/377,427, which was filed in the U.S. Patent and Trademark Office on Dec. 9, 2011, which is a National Phase entry of PCT International Application No. PCT/KR2010/003602, which was filed on Jun. 4, 2010, and claims priority under 35 U.S.C. § 119(a) to Korean Patent Application Serial No. 10-2009-0051054, which was filed in the Korean Intellectual Property Office on Jun. 9, 2009, and to Korean Patent Application Serial No. 10-2009-0104341, which was filed in the Korean Intellectual Property Office on Oct. 30, 2009, the entire content of each of which is incorporated herein by reference.

BACKGROUND OF THE DISCLOSURE

1. Field of the Disclosure

The present disclosure relates generally to a method and device for broadcasting contents, and more particularly, to a method and device for broadcasting contents in order to allow a plurality of devices to share contents.

2. Description of the Related Art

Recently, there has been a need to share a function corresponding to a single user with other users through a plurality of devices. More specifically, users may desire to share their own content and games with other users.

In addition, as the amount and speed of data being transmitted increases in communication interfaces, it has become easier to share contents or data in real time. In the past, transmitting a single file from one device to another took a considerable amount of time, and if the file was large, a user had to wait for a prolonged period of time. However, as the amount and speed of data transmission improves, the time for transmission of data has been reduced dramatically, and data having a small volume can be transmitted in near-real time.

In order to communicate with other devices, a user previously had to set a communication interface for each device. However, it has become possible for each device to search for an optimum communication interface and change corresponding settings automatically, making it easier for devices to communicate with other devices to share contents. For example, if a device having wireless Local Area Networking (LAN) enters an area where wireless Internet is available, the settings of the device are changed automatically so that wireless Internet can be used.

However, there is still a need for a method that allows a user to share contents, data, or a function with other users more conveniently.

SUMMARY OF THE DISCLOSURE

Accordingly, the present disclosure has been made to solve at least the above-described problems occurring in the prior art, and to provide at least the following advantages.

According to an aspect of the present disclosure, a content broadcasting method of a device is provided. The method includes displaying a host content window in which a first content is displayed, and displaying an application window in which a second content is displayed, the second content being provided by an application which is executed in the device, where only the first content among the first content and the second content is broadcast to an external device connected to the device.

According to another aspect of the present disclosure a device is provided. The device includes a display, a communication unit configured to communicate with an external device, and a controller configured to control the display to display a host content window in which a first content is displayed and display an application window in which a second content is displayed, the second content being provided by an application which is executed in the device, where the controller broadcasts only the first content among the first content and the second content to the external device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS OF THE PRESENT DISCLOSURE

Various embodiments of the present disclosure will be described in detail below with reference to the accompanying drawings. In the following description, specific details such as detailed configuration and components are merely provided to assist in the overall understanding of the embodiments of the present disclosure. Therefore, it should be apparent to those of ordinary skill in the art that various changes and modifications of the embodiments described herein can be made without departing from the scope and spirit of the disclosure. In addition, descriptions of well-known functions and constructions are omitted for clarity and conciseness.

Figure 1:
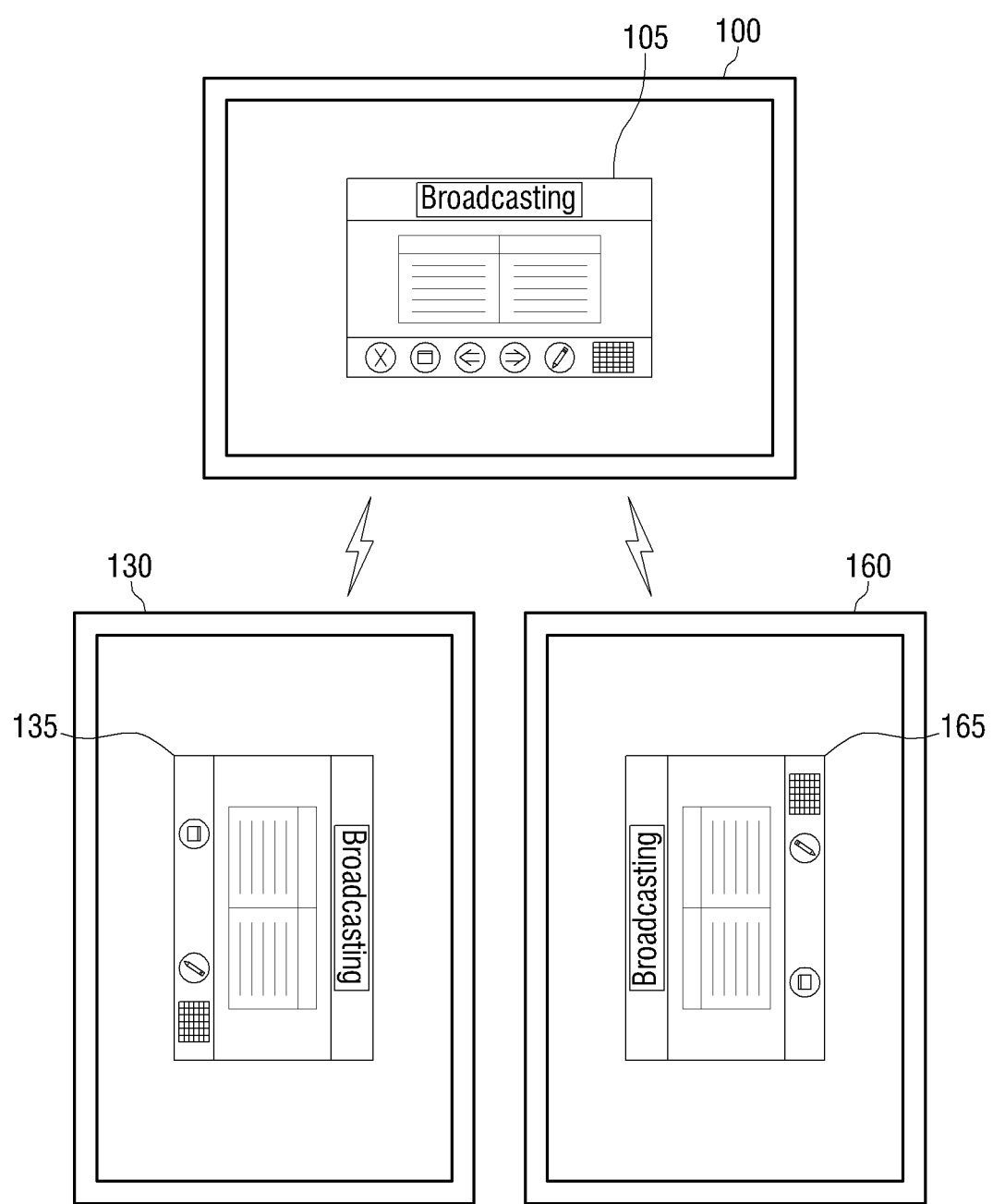
FIG. 1 illustrates a broadcast system in which a host device broadcasts contents to a first guest device and a second guest device according to an embodiment of the present disclosure.

FIG. 1 illustrates a broadcast system in which a host device broadcasts contents to a first guest device and a second guest device according to an embodiment of the present disclosure.

Referring to FIG. 1, in the broadcast system according to an embodiment of the present disclosure, a host device 100 broadcast contents to a first guest device 130 and a second guest device 160. The host device 100, the first guest device 130, and the second guest device 160 have touch screens that are connected with each other for communication.

A user's input may be received, not only through a touch screen, but also though a pointing device (not shown). The pointing device includes an infrared light emitting unit, an infrared sensing unit, a laser generating unit, accelerator sensor, gyro sensor, and etc. and may calculate a user's input into a coordinates corresponding to a pointing location.

If an infrared light emitting unit is mounted on a pointing device, an infrared sensing unit may be mounted on the host device 100 or the guest devices 130 and 160. Alternatively, if an infrared sensing unit is mounted on a pointing device, an infrared light emitting unit may be mounted on the host device 100 or the guest devices 130 and 160.

The laser-sensing unit may be embodied as a camera or any device that can recognize laser generated by the laser generating unit. For example, a pointing device having a laser generating unit may be a laser pointer.

The host device 100 manages broadcasting contents. Accordingly, the host device 100 is determined by a function that is currently provided by the host device 100, and the host device 100 may perform a function of a client later.

As illustrated in FIG. 1, the host device 100 broadcasts contents displayed on a host content window 105. Subsequently, the first guest device 130 displays contents broadcast from the host device 100 on a first guest content window 135. The second guest device 160 also displays contents broadcast from the host device on a second guest content window 165. Herein, the contents may include a still image, a moving image, audio and all contents that can be used in the host device 100. In addition, the contents may be transmitted from a device other than the host device 100, or contents generated by the host device 100 according to a user's input. Such a device other then the host device 100 may be an external device connected via cable or wirelessly.

The contents may only be manipulated on the host content window 105 of the host device 100, while the first guest device 130 and the second guest device 160 receive and display contents manipulated by the host device 100.

The same contents may be viewed through devices of a plurality of users using a broadcast system. Accordingly, a plurality of users may have a meeting or perform a cooperative work together using such a broadcast system.

Hereinafter, the operations of the host device 100, the first guest device 130, and the second guest device 160 are explained in detail.

The type of window for displaying contents are described with reference to FIGS. 2 to 4.

Figure 2:
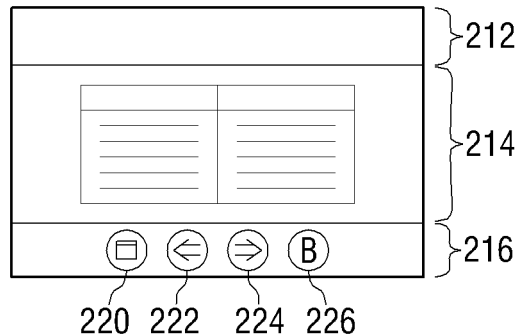
FIG. 2 illustrates a host content window before contents are broadcast according to an embodiment of the present disclosure.

FIG. 2 illustrates a host content window for broadcasting contents according to an embodiment of the present disclosure.

The host content window 210 includes a title area 212, a content display area 214, and a command icon display area 216.

The title area 212 displays a title of the host content window 210. The content display area 214 displays current contents. The command icon display area displays icons for inputting various commands.

As illustrated in FIG. 2, a full screen icon 220, a front page icon 222, a back page icon 224, and a broadcast start icon 226 are displayed before contents are broadcast.

The full screen icon 220 is used for inputting a command to display the host content window 210 in full screen.

The front page icon 222 is used for inputting a command to turn the page of contents forward, and the back page icon 224 is used for inputting a command to turn the page of contents backward. The front page icon 222 and the back page icon 224 are used for inputting commands with regard to manipulation of contents displayed on the host content window 210 because if the front page icon 222 is touched, the current page of contents are turned to the previous page and thus, the current contents are changed.

An icon for inputting commands with regard to manipulation of contents is displayed only on the host device 100 since the host device 100 takes the lead in manipulating contents and the guest devices 130 and 160 only display what is received from the host device 100.

The broadcast start icon 226 is used for inputting a command to start broadcasting contents currently displayed. If a user touches the broadcast start icon 226 to start broadcasting, a host content window 230 in FIG. 3 is displayed.

Figure 3:
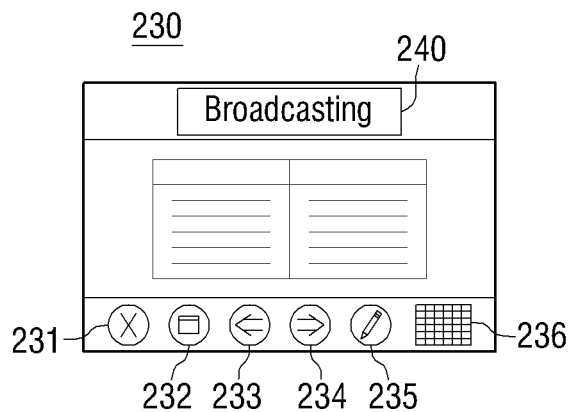
FIG. 3 illustrates a host content window for broadcasting contents according to an embodiment of the present disclosure.

FIG. 3 illustrates the host content window for broadcasting contents according to an embodiment of the present disclosure.

As illustrated in FIG. 3, a broadcast end icon 231, a full screen icon 232, a front page icon 233, a back page icon 234, a pen icon 235, and a pallet icon 236 are displayed on the host content window 230 for broadcasting contents. A further description regarding components that are already described with reference to FIG. 2 will not be provided for clarity and conciseness.

In contrast to FIG. 2, the host content window 230 for broadcasting contents in FIG. 3 further displays the broadcast end icon 231, the pen icon 235, and the pallet icon 236, and a broadcasting indicator 240 is displayed on an upper portion of the host content window 230.

The broadcast end icon 231 is used for inputting a command to end broadcasting. More specifically, if a user touches the broadcast end icon 231, the host device ends broadcasting.

The pen icon 235 is used for inputting a command to perform a function of taking notes. Herein, the function of taking notes refers to a function that allows a user to directly input a certain line on a touch screen. The pen icon 235 may be realized in the form of toggling. Therefore, if a user touches the pen icon 235 once, the pen icon 235 may perform a note-taking function, and if the user touches the pen icon 235 once again, the pen icon 235 may release the note-taking function.

The pallet icon 236 is used to input a command for selecting colors used in the note-taking function. If a user touches the pallet icon 236, a big color selection board is displayed. Accordingly, the user may select colors to be used for the note-taking function by touching colors in the color selection board.

The broadcasting indicator 240 indicates that the host device 100 is currently broadcasting contents. If the broadcast indicator 240 is displayed on the host content window 230, a user may recognize that contents are being broadcast.

As such, the host content window 210 before broadcasting is different from the host content window 230 during broadcasting in its configuration.

Figure 4:
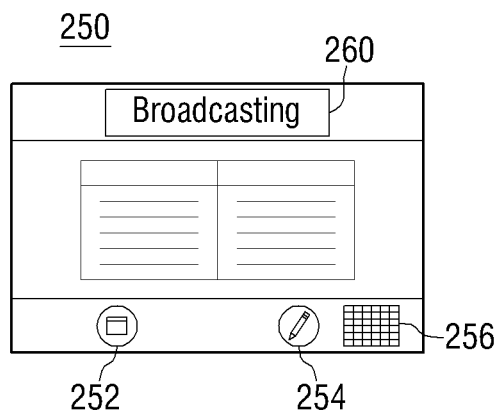
FIG. 4 illustrates a guest content window according to an embodiment of the present disclosure.

FIG. 4 illustrates a guest content window according to an embodiment of the present disclosure.

As illustrated in FIG. 4, only a full screen icon 252, a pen icon 254, and a pallet icon 256 are displayed on the guest content window 250. Icons for manipulating contents such as a front page icon and a back page icon are not displayed on the guest content window 250 of FIG. 4.

A broadcast indicator 260 for indicating that broadcast is being received is also displayed on the upper portion of the guest content window 250.

As described above, the host content window 210, 230 and the guest content window 250 are windows that display contents, and the host content window 210, 230 before broadcasting are different from the host content window 210, 230 after broadcasting.

Hereinafter, the process where the host device 100 starts broadcasting is described with reference to FIGS. 5 to 8.

Figure 5:
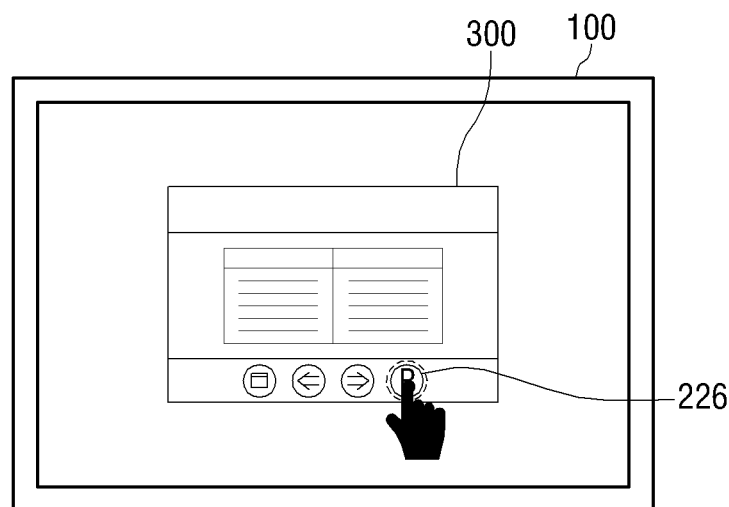
FIG. 5 illustrates an example of a user touching an icon for starting a broadcasting according to an embodiment of the present disclosure.
Figure 5:
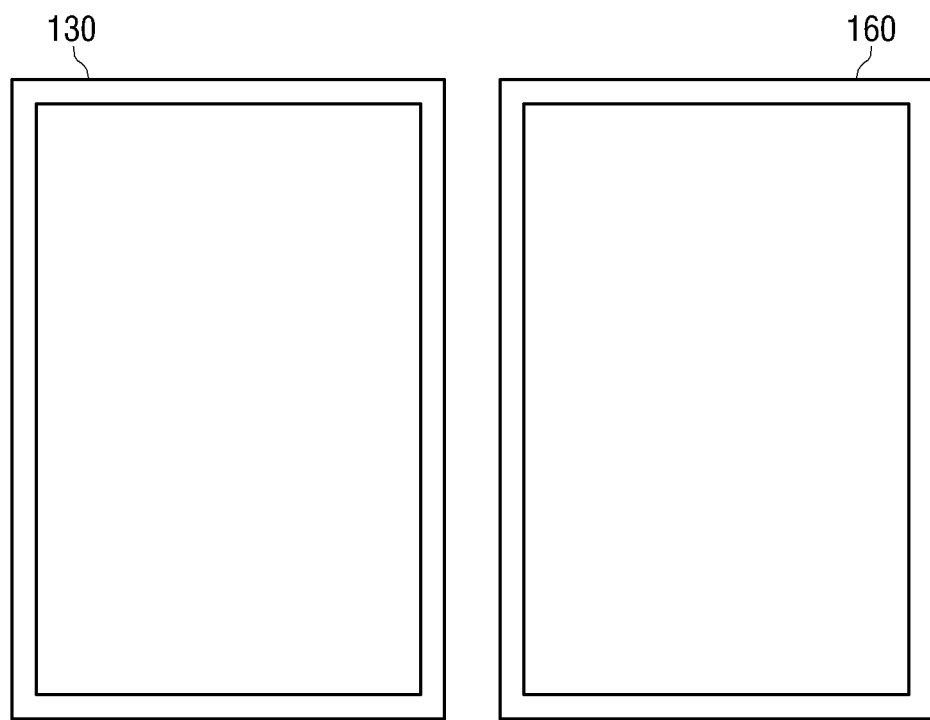
Figure 6:
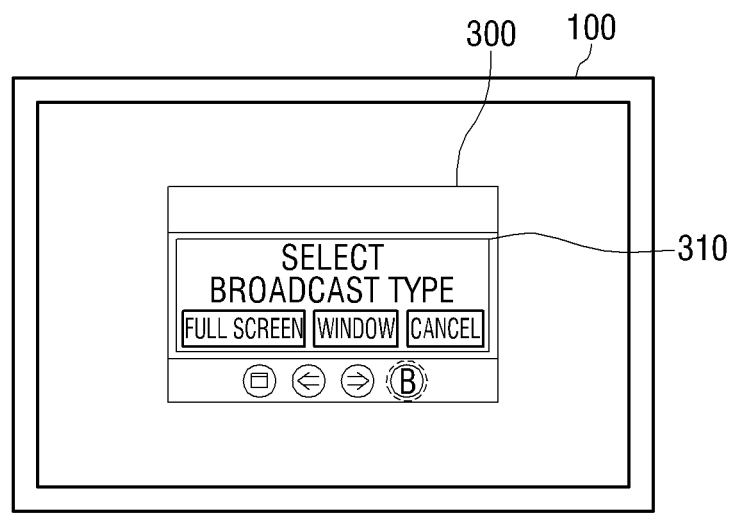
FIG. 6 illustrates a screen where a menu for selecting a broadcast type is displayed according to an embodiment of the present disclosure.
Figure 6:
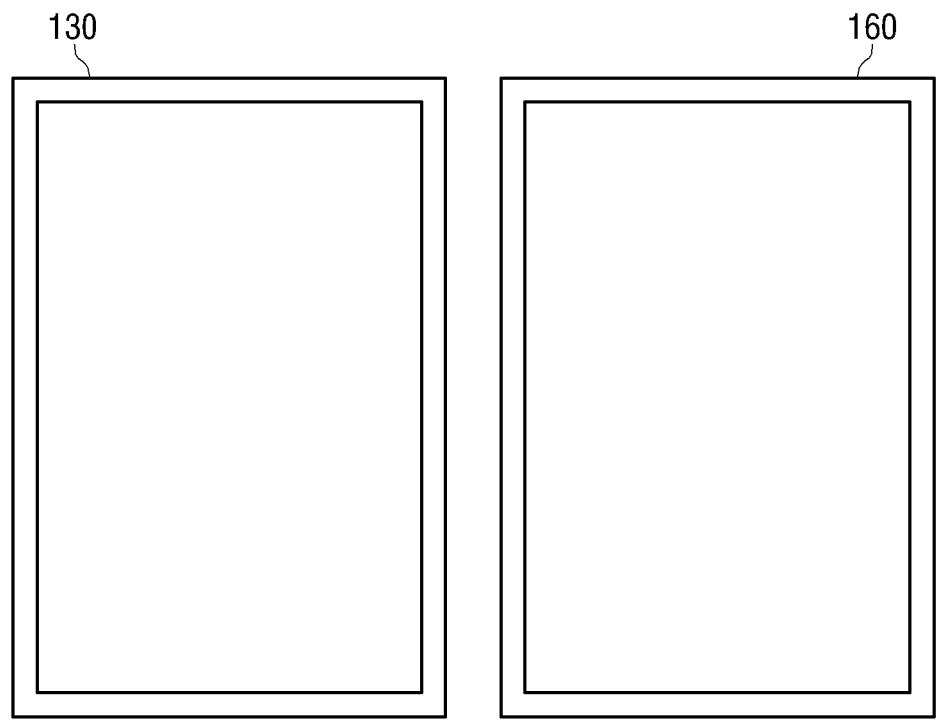
Figure 7:
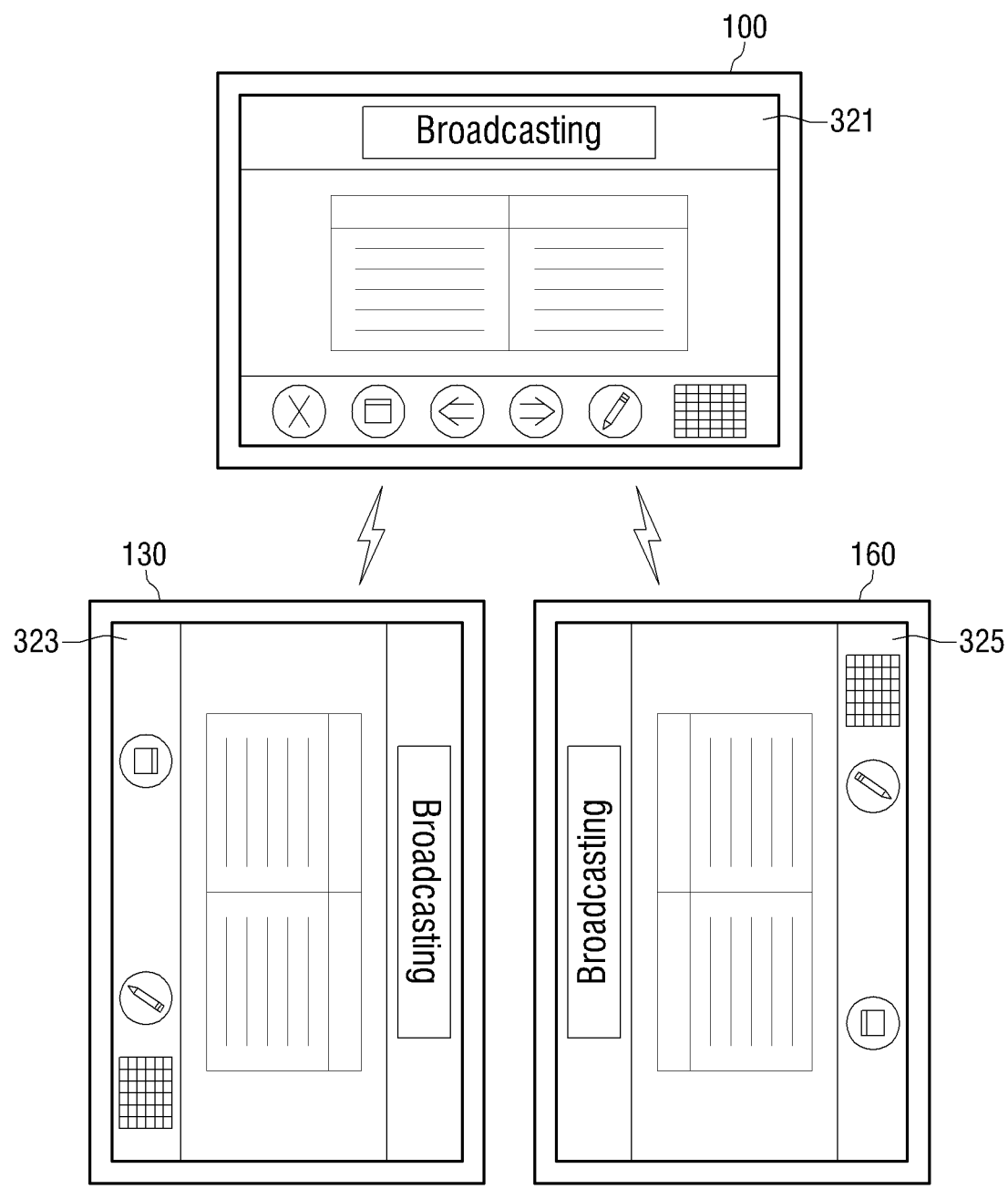
FIG. 7 illustrates a full-screen-type broadcast according to an embodiment of the present disclosure.
Figure 8:
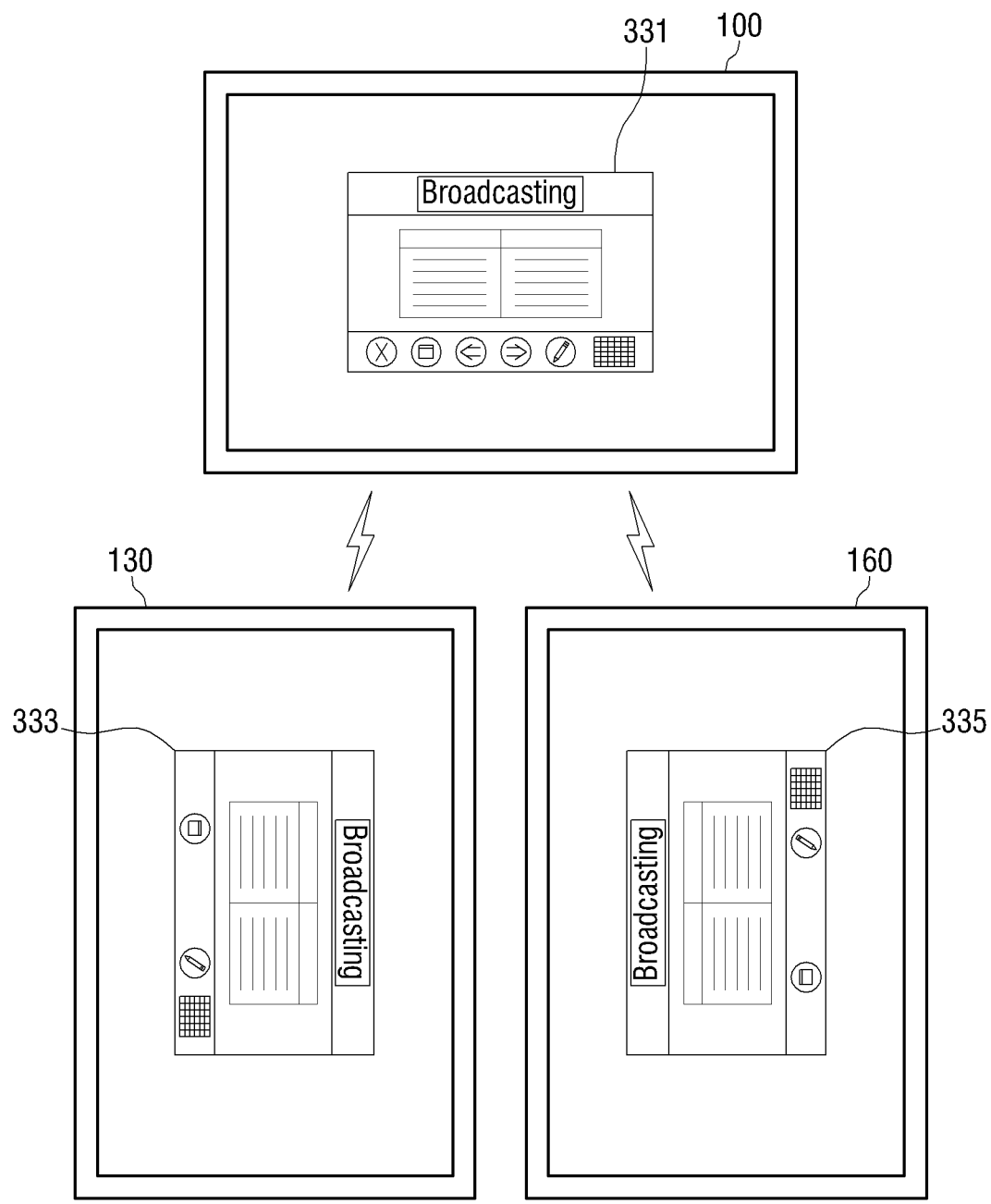
FIG. 8 illustrates a window-type broadcast according to an embodiment of the present disclosure.

FIG. 5 illustrates an example of a user touching an icon for starting a broadcasting according to an embodiment of the present disclosure. FIG. 6 illustrates a screen where a menu for selecting a broadcast type is displayed according to an embodiment of the present disclosure. FIG. 7 illustrates a full-screen-type broadcast according to an embodiment of the present disclosure. FIG. 8 illustrates a window-type broadcast according to an embodiment of the present disclosure.

As illustrated in FIG. 5, the host device 100 displays a host content window 300 before broadcasting in FIG. 2. As the host device 100 does not start broadcasting yet, nothing is displayed on the screens of the first guest device 130 and the second guest device 160.

Referring back to FIG. 5, if a user touches the broadcast start icon 226, the broadcast type selection menu 310 is displayed as illustrated in FIG. 6. There are a full screen type and a window type.

If a user selects a full screen type as a broadcast type, broadcasting is provided on a full screen as illustrated in FIG. 7. As illustrated in FIG. 7, the host device 100 displays the host content window 321 on a full screen.

In addition, the first guest device 130 displays a first guest content window 323 on a full screen, and the second guest device 160 displays a second guest content window 324 on a full screen.

The contents displayed on the host content window 321 are also displayed on the first guest content window 323 and the second guest content window 325. In other words, the host device 100 broadcast contents, and the first guest device 130 and the second guest device 160 receives and displays the contents being broadcast by the host device 100.

Meanwhile, if a user selects a window type as a broadcast type in FIG. 6, contents are broadcast on a full screen as illustrated in FIG. 8. As illustrated in FIG. 8, the host device 100 displays the host content window 321 in the form of a window on one portion of the screen. In addition, the first guest device 130 displays the first guest content window 323 in the form of a window, and the second guest device 160 displays the second guest content window 325 in the form of a window.

In this case, the contents displayed on the host content window 321 are also displayed on the first guest content window 323 and the second guest content window 325. Meanwhile, if a use selects cancellation in FIG. 6, the host device 100 returns to the state illustrated in FIG. 5.

Through the above process, the host device 100 may broadcast contents to the first guest device 130 and the second guest device 160.

Hereinafter, the process of using a note-taking function during broadcasting will be explained with reference to FIGS. 9 to 16.

Figure 9:
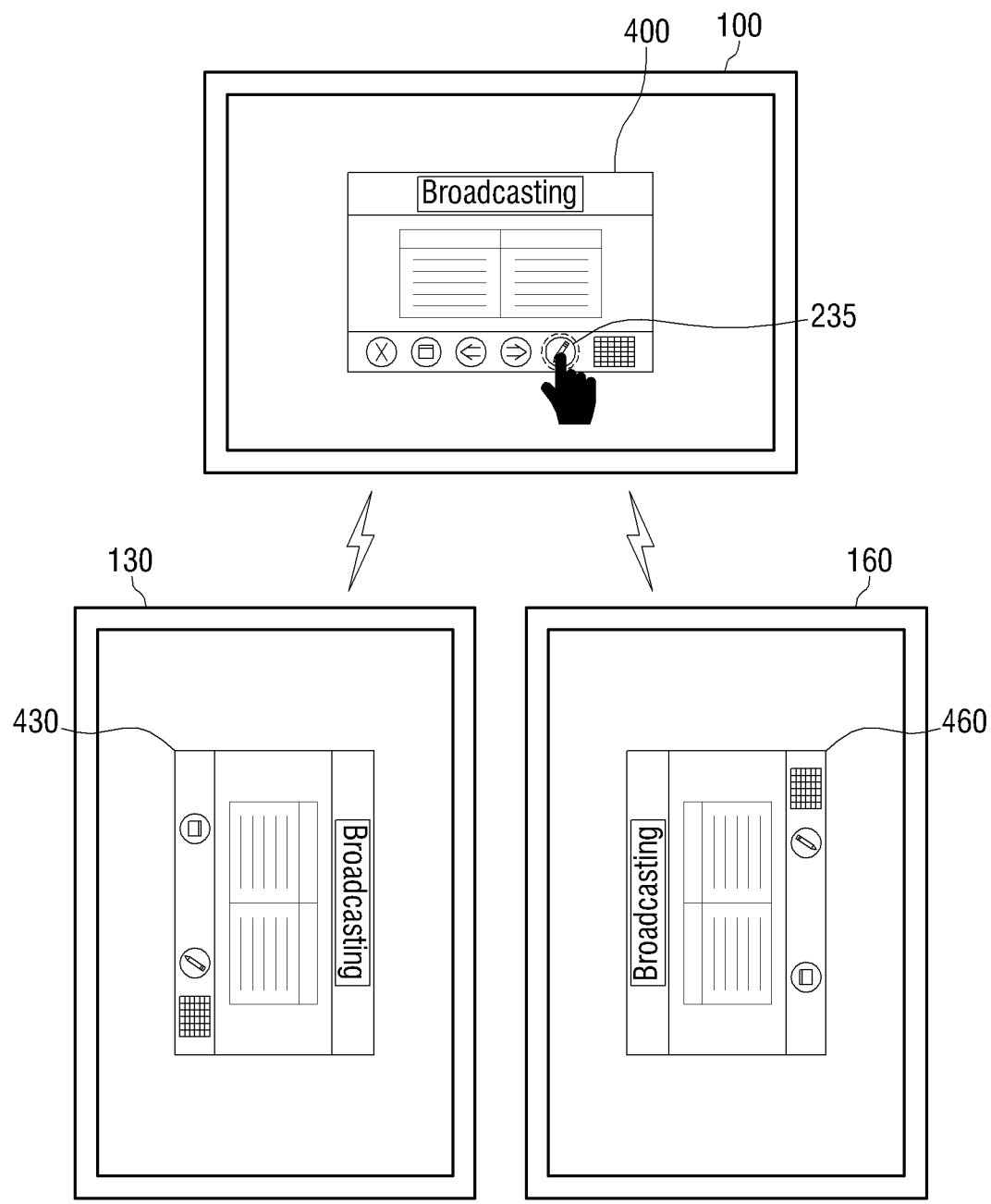
FIG. 9 illustrates an example of a user touching a pen icon of a host device according to an embodiment of the present disclosure.

FIG. 9 illustrates an example of a user touching a pen icon of a host device according to an embodiment of the present disclosure.

As illustrated in FIG. 9, a host content window displays the pen icon 235 to activate a note-taking function. Herein, the note-taking function refers to a function where a text or a drawing written on a screen via a user's touch is recognized and received by the host device 100. Alternatively, if a user inputs a text or a drawing using a pointing device, the host device 100 may receive the text or the drawing by recognizing the location pointed by the user. In this case, if a user points to the pen icon 235 using a pointing device and presses a separate selection button, the note-taking function is activated. The note-taking function may also be realized on the guest devices 130 and 160.

Figure 10:
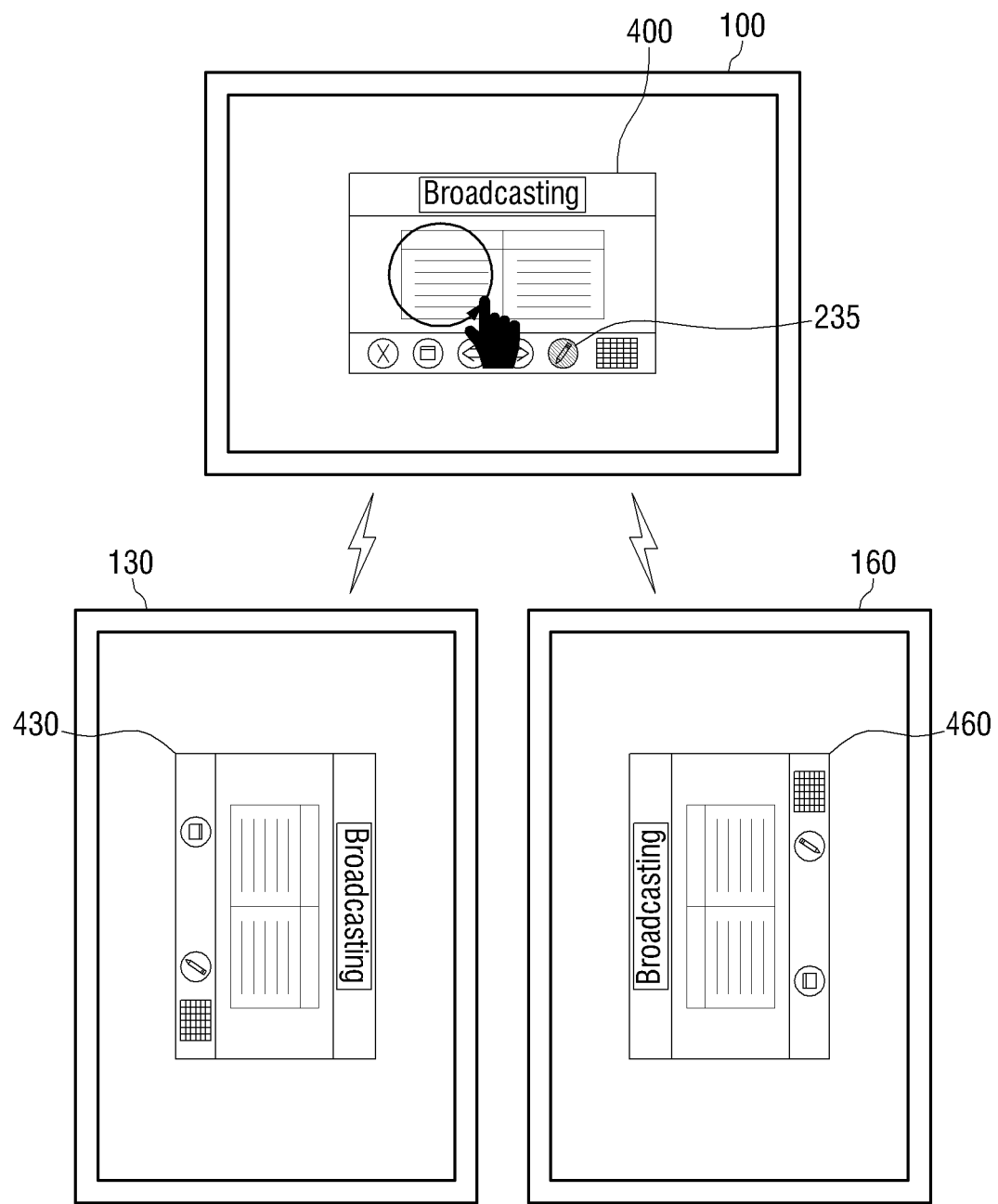
FIG. 10 illustrates an example of a user is drawing a circle on a host content window according to an embodiment of the present disclosure.

If a user touches the pen icon 235, the pen icon 235 is highlighted to indicate that the note-taking function is activated as illustrated in FIG. 10. Herein, the pen icon 235 can be highlighted using a thicker color or using a different color. In this state, if the user moves his or her hand or pen while touching the screen with the hand or pen, a line is drawn on the screen accordingly. Therefore, the user may use the note-taking function to write a desired text or drawing. In this case, the note-taking function may be realized using a pointing device. A cursor may be displayed at a location where a pointing device points to. The shape of the cursor may be changed by a user.

FIG. 10 illustrates an example of a user is drawing a circle on a host content window according to an embodiment of the present disclosure As illustrated in FIG. 10, if a user draws a circle on the host device 100, the host device 100 broadcasts the note-taking information input by the user. Accordingly, the first guest device 130 and the second guest device 160 may receive the note-taking information and displays the note-taking information on the screen.

In this case, a screen including the circle may be generated as a single image file and then transmitted, or only the circle may be generated as a single image file and information regarding the location of the circle may be generated separately and then transmitted together.

Figure 11:
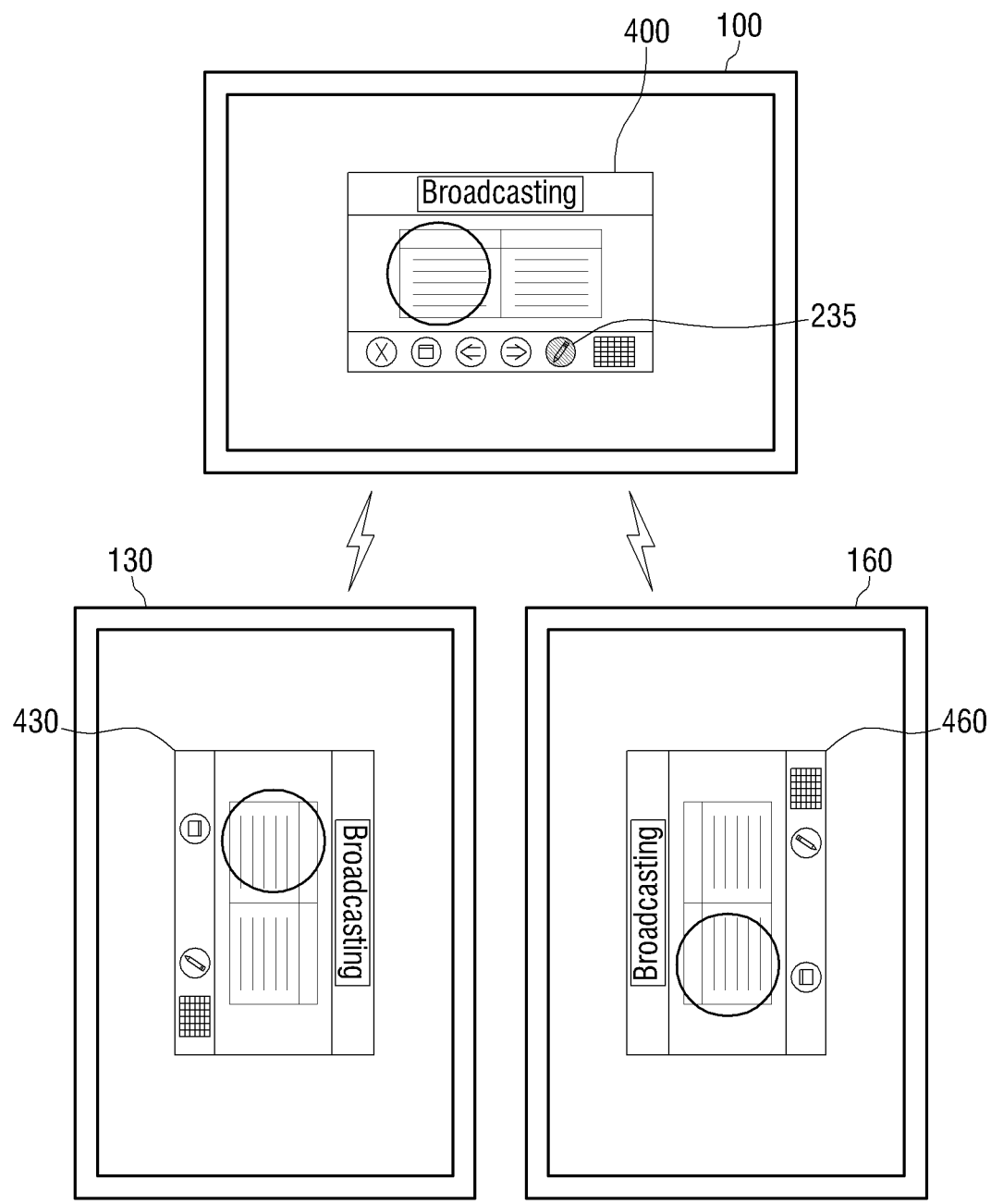
FIG. 11 illustrates a circle on a host device is also displayed on a first guest device and a second guest device according to an embodiment of the present disclosure.

FIG. 11 illustrates a circle on a host device is also displayed on a first guest device and a second guest device according to an embodiment of the present disclosure.

As illustrated in FIG. 11, the circle displayed on the host content window 200 is also displayed on a first guest content window 430 and a second guest content window 460. The first guest device 130 and the second guest device 160 may receive and display a full screen with a circle as a single image file or may display an image file with a circle by referring to information regarding a location of the circle.

As such, the contents on the host device 100 are also displayed on the first guest device 130 and the second guest device 160 and thus, a plurality of users may work cooperatively using the host device 100, the first guest device 130 and the second guest device 160. In this case, the guest devices 130 and 160 may be host devices if necessary. The device where a user's note-taking information is input becomes a host device.

Figure 12:
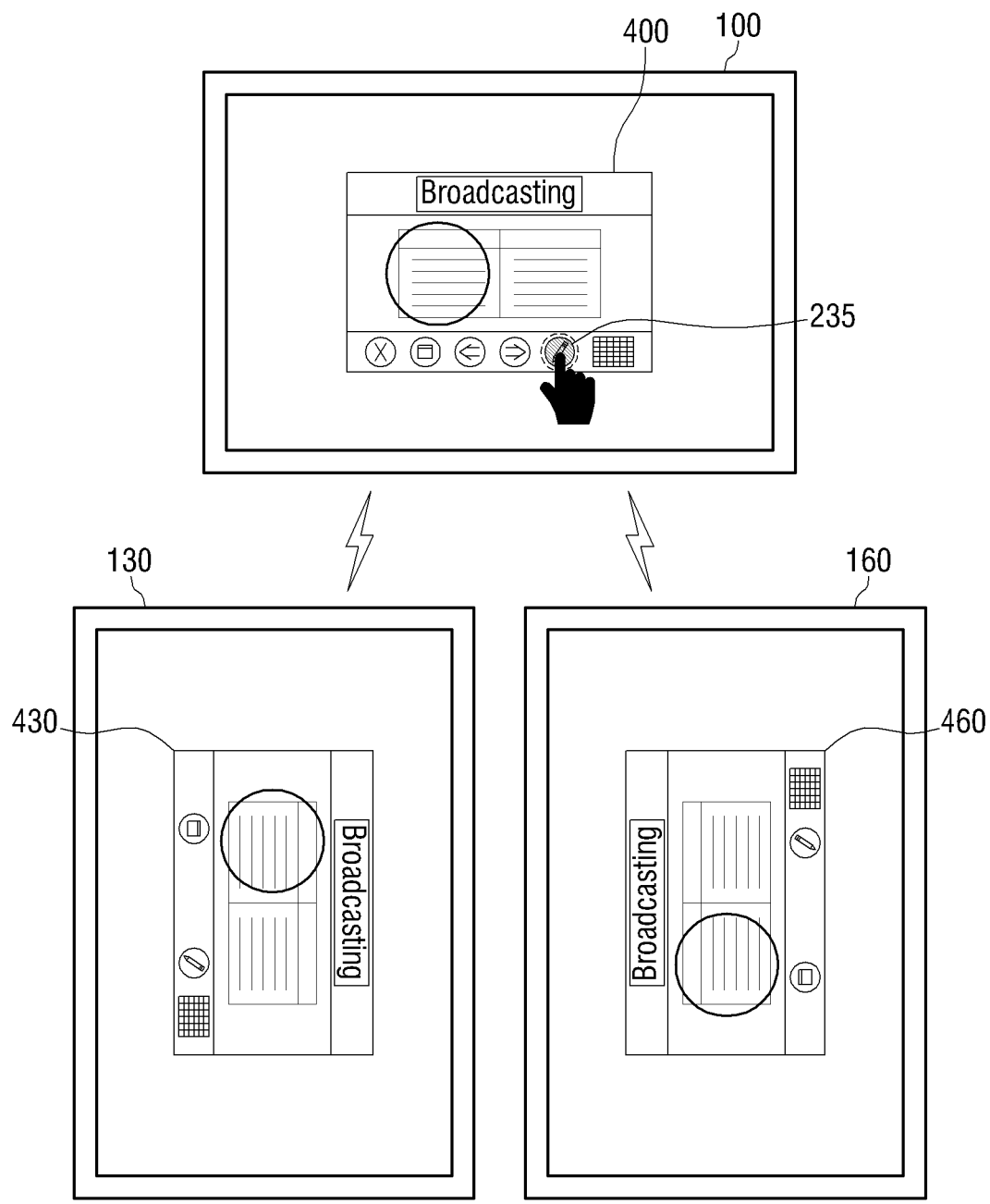
FIG. 12 illustrates an example of a user touching a pen icon of a host device once according to an embodiment of the present disclosure.
Figure 13:
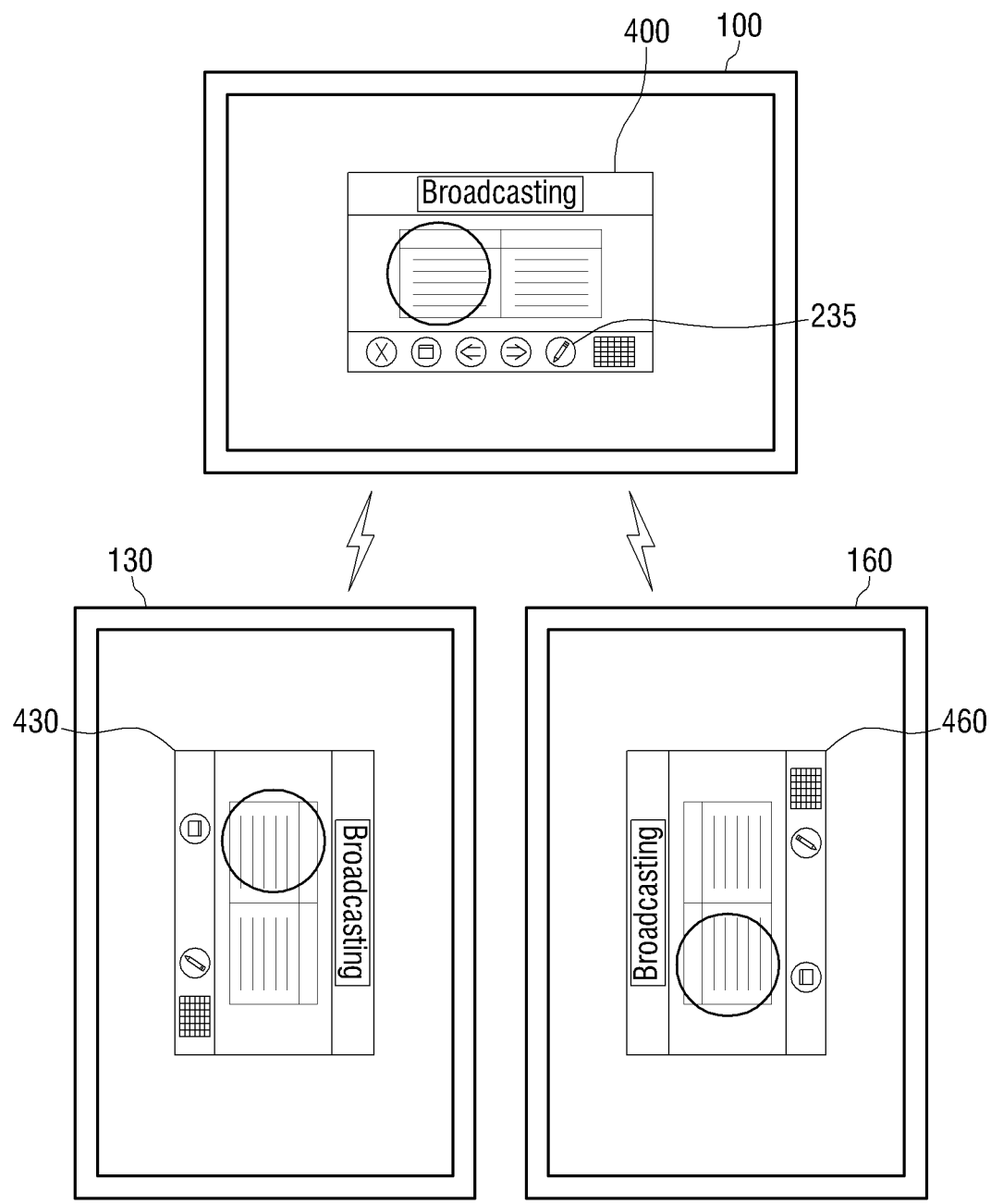
FIG. 13 illustrates a screen where a pen icon of a host device has been returned to its original state according to an embodiment of the present disclosure.

FIG. 12 illustrates an example of a user touching a pen icon of a host device once according to an embodiment of the present disclosure. FIG. 13 illustrates a screen where a pen icon of a host device has been returned to its original state according to an embodiment of the present disclosure.

As illustrated in FIG. 12, if a user touches the highlighted pen icon 235, the highlight of the pen icon 235 is released and the note-taking function is inactivated as illustrated in FIG. 13. As such, the pen icon 235 operates using a toggling method. As described above, a user may use the note-taking function using the pen icon 235, and the text or drawing input from the host device 100 may be broadcast to the guest devices 130 and 160.

In addition, the text or drawing input from the guest devices 130 and 160 may be broadcast to the host device 100 and other guest devices. This broadcast is explained I more detail herein with reference to FIGS. 14 to 16.

Figure 14:
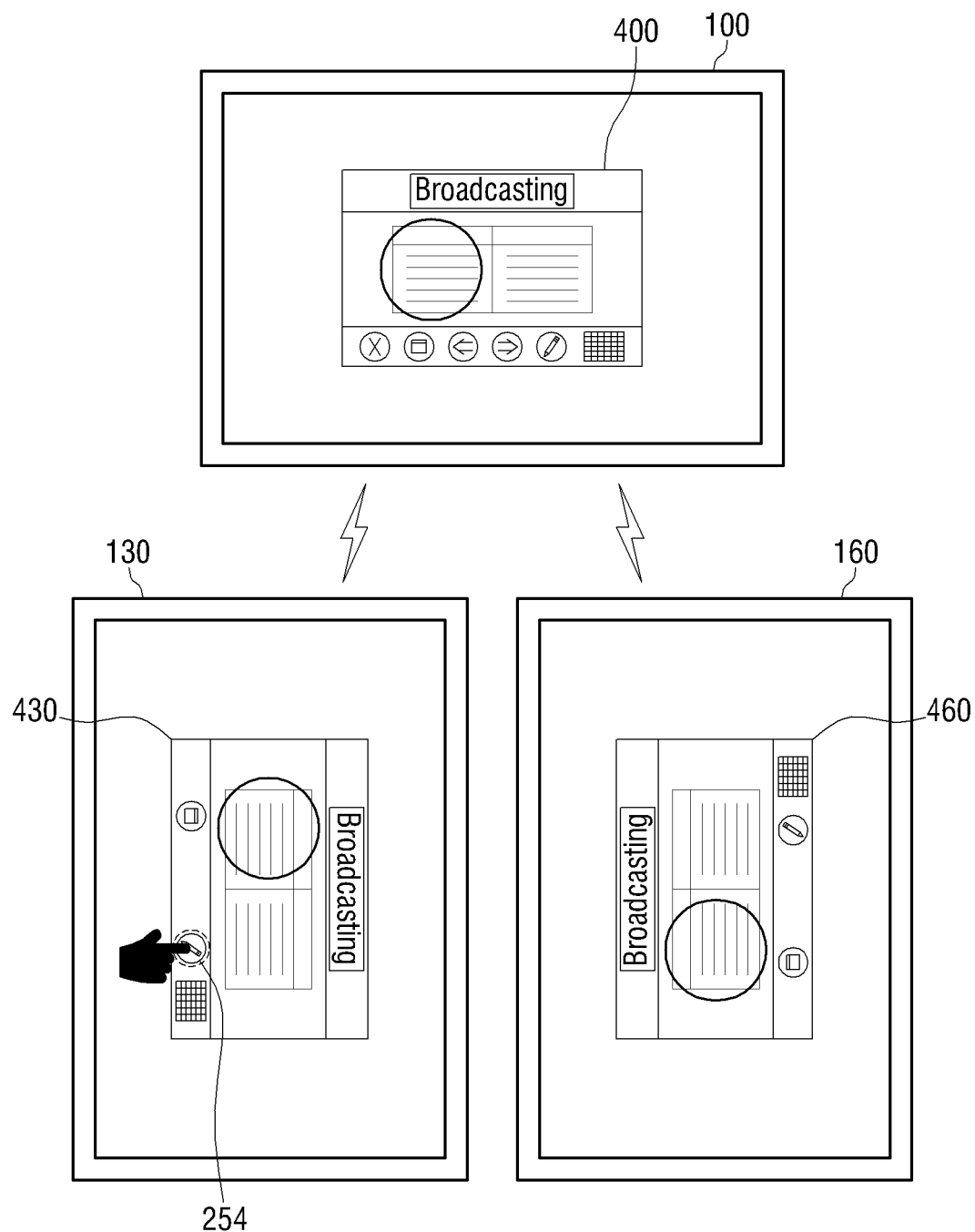
FIG. 14 illustrates an example of a user touching a pen icon of a first guest device according to an embodiment of the present disclosure.

FIG. 14 illustrates an example of a user touching a pen icon of a first guest device according to an embodiment of the present disclosure.

As illustrated in FIG. 14, if a user touches the pen icon 254 of the first guest device 130, the first guest device activates the note-taking function. A pointing device may be used to input a user's command with regard to the first guest device 130 as in the host device 100.

Figure 15:
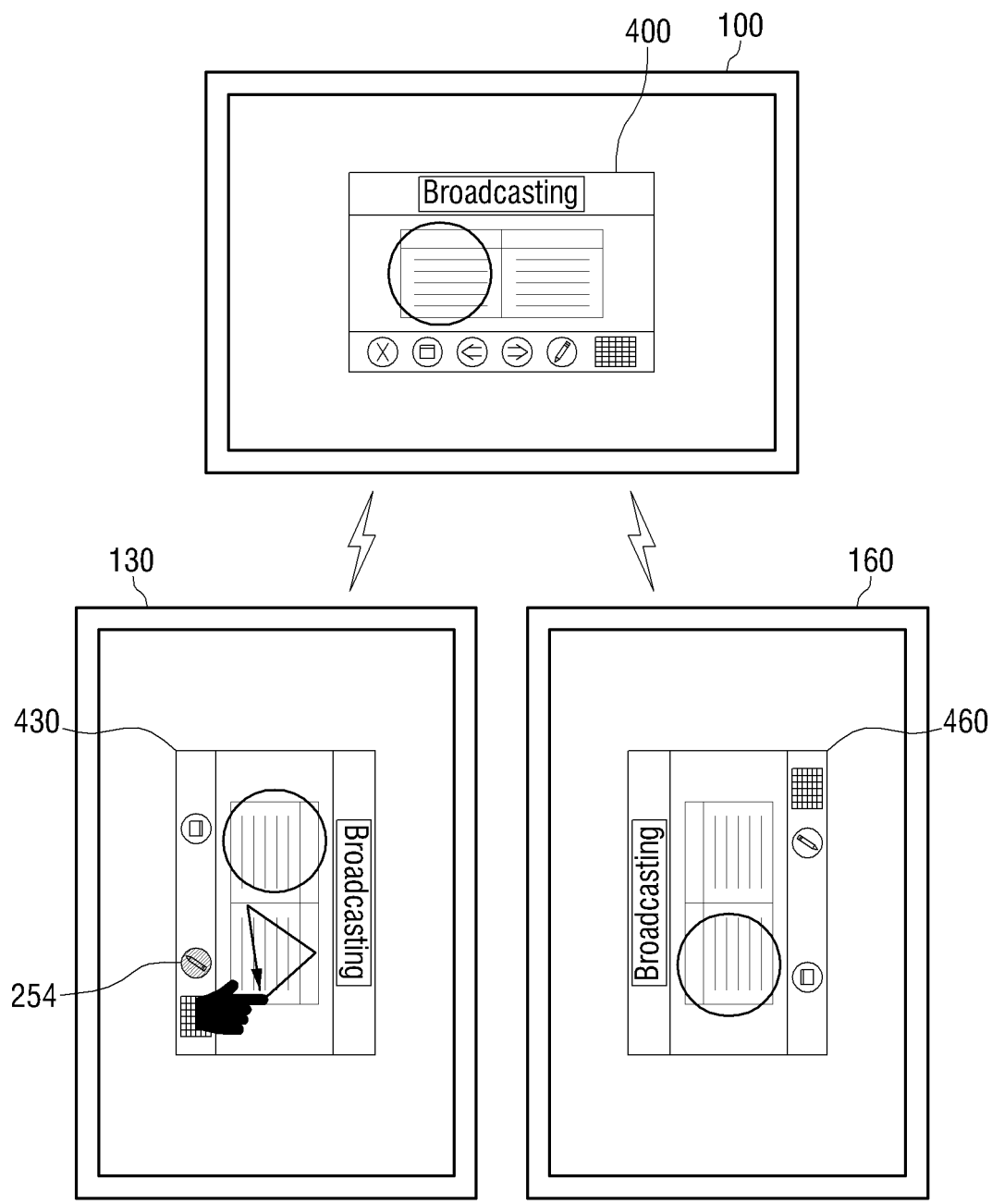
FIG. 15 illustrates an example of a user is drawing a triangle on a first guest content window according to an embodiment of the present disclosure.

FIG. 15 illustrates an example of a user is drawing a triangle on a first guest content window according to an embodiment of the present disclosure.

As illustrated in FIG. 15, the pen icon 254 is activated as the note-taking function is activated in the first guest device 130. In this state, a user may perform note-taking on the screen of the first guest device 130.

In FIG. 15, a user is drawing a triangle on the first guest content window 430. As such, if a user draws a triangle on the first guest content window 430, the first guest device 130 transmits the note-taking information to the host device 100 and the second guest device 160.

Figure 16:
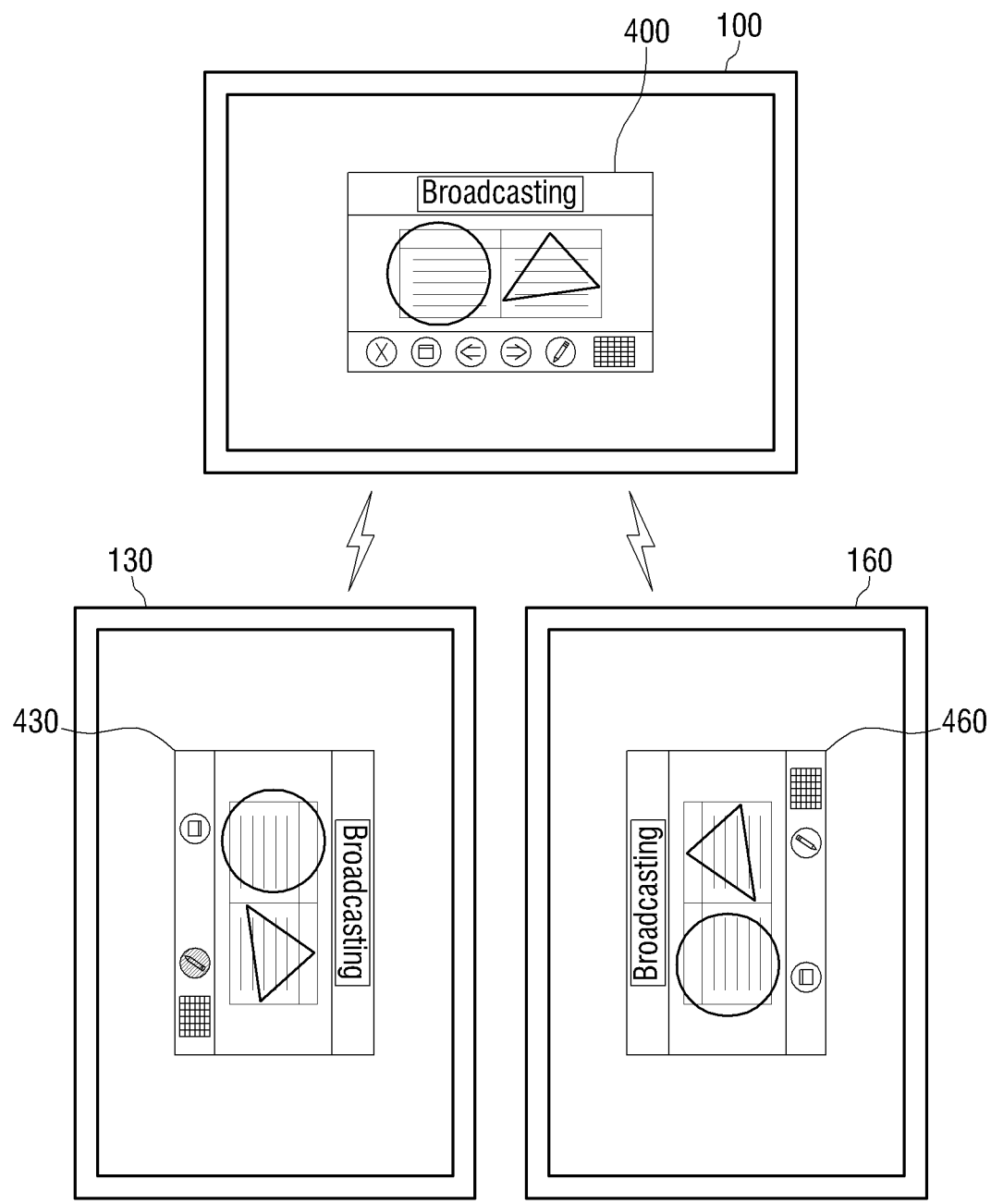
FIG. 16 illustrates a triangle on a first guest device is also displayed on a host device and a second guest device according to an embodiment of the present disclosure.

FIG. 16 illustrates a triangle on a first guest device is also displayed on a host device and a second guest device according to an embodiment of the present disclosure.

As illustrated in FIG. 16, the note-taking information regarding the triangle drawn on the first guest device 130 is transmitted to the host device 100 and the second guest device 160. Accordingly, the triangle drawn on the first guest device 130 is also displayed on the host device 100 and the second guest device 140. As such, the guest device 130 may not change the contents that are currently being displayed but may perform the note-taking function and transmit the note-taking information to another device. In addition, the host device 100 and the guest devices 130 and 160 may store note-taking information. The host device 100 and the guest devices 130 and 160 may also be configured to delete the note-taking information after a predetermined period of time elapses.

Further, different colors used for note-taking may be set for each device. For example, the note-taking by the host device 100 may be displayed in red, the note-taking by the first guest device 130 may be displayed in green, and the note-taking by the second guest device 160 may be displayed in blue. As such, colors are used differently for each device and thus, a user may recognize who is doing which note-taking easily.

In this case of different note-taking colors for each device, a separate icon for selecting colors on the content windows 400, 430, 460 may be displayed, and a plurality of colors may be selected for each device. For example, three colors may be allocated to each device and one out of the three colors may be selected. In addition, a different color may be allocated to each device. For example, if red, orange, and yellow are allocated to the host device 100, green, blue, and purple may be allocated to the first guest device 130. This color-selection scheme is useful when a single device is used by a plurality of users while a user of one of the devices wishes to change colors.

In addition, each color used by a user may be stored in a separate file and thus, note-taking information of each user may be identified later. Further, it is also possible to delete note-taking by each color. The note-taking information input by a specific user from among a plurality of users may be obtained, and a GUI for selecting a user or a color may be provided.

Hereinafter, the operation of broadcasting contents while performing multi-tasking with another job is described with reference to FIG. 17.

Figure 17:
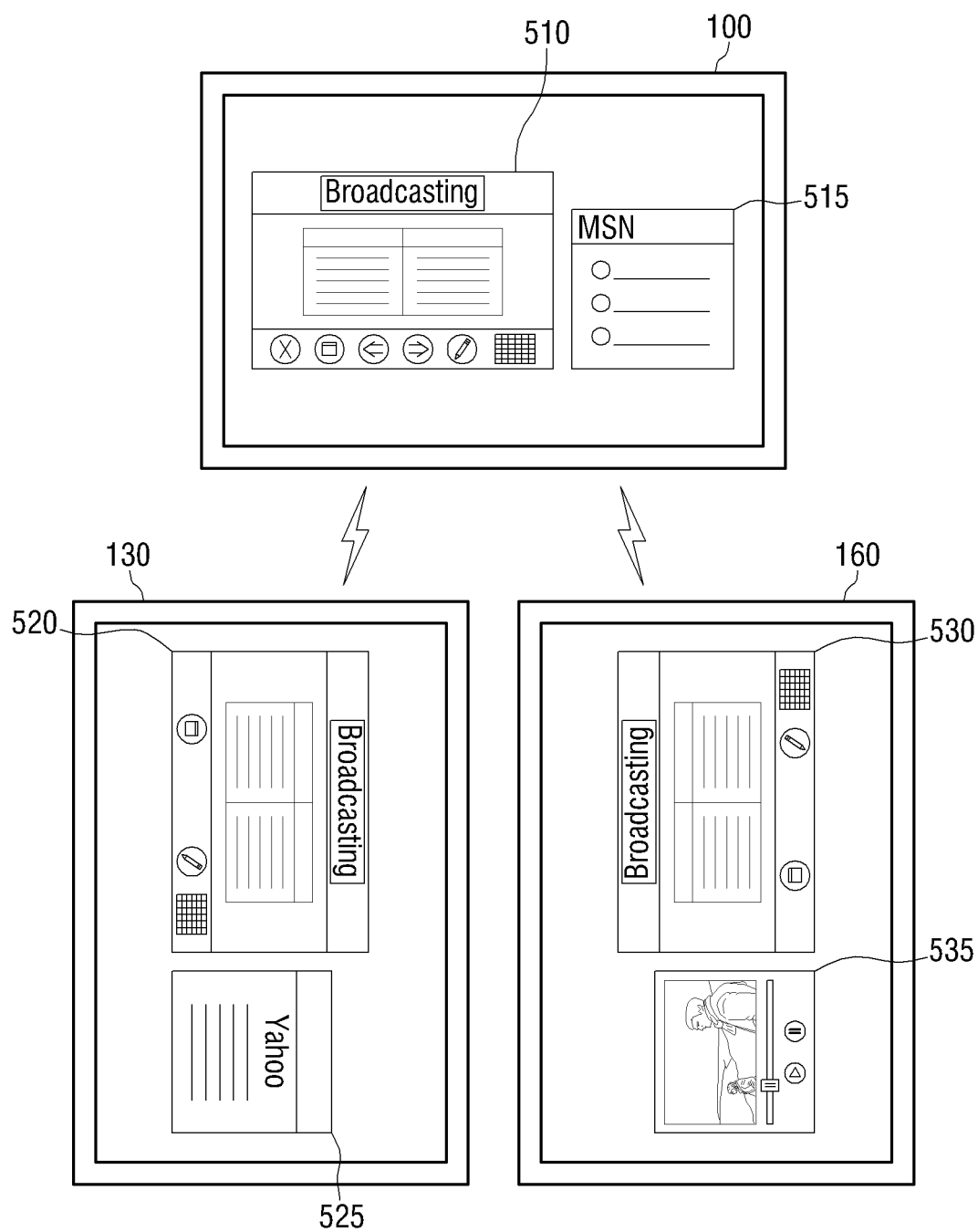
FIG. 17 illustrates broadcasting contents while multitasking with another application according to an embodiment of the present disclosure.

FIG. 17 illustrates broadcasting contents while multi-tasking with another application according to an embodiment of the present disclosure.

As illustrated in FIG. 17, the host device 100 may recognize that a host content window 510 is displayed along with a first application window 515. More specifically, the host device 100 may broadcast contents of the host content window 510 while executing the first application 515.

The first guest device 130 may also display broadcast contents on a first guest content window 520 while displaying a second application window 525 on the screen. More specifically, the first guest device 130 may also display the first guest content window 520 displaying broadcast contents while executing the second application 525 at the same time.

The second guest device 160 may also display broadcast contents on a second guest content window 530 while displaying a third application window 535 on the screen. More specifically, the second guest device 160 may also display the second guest content window 530 displaying broadcast contents while executing the third application 535 at the same time.

As such, the host device 100 and guest devices 130 and 160 may display broadcast contents while performing multitasking with another job.

Figure 18:
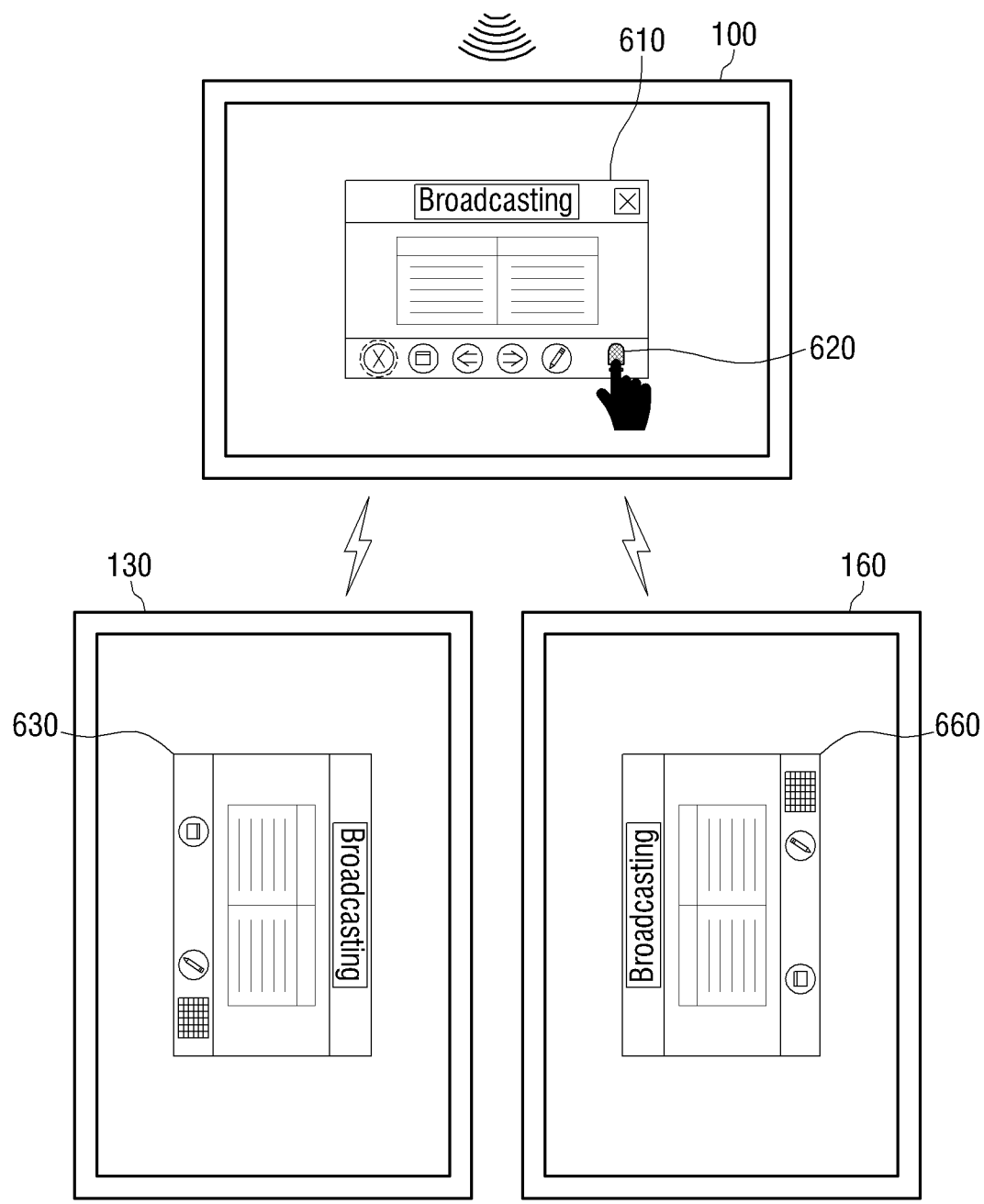
FIGS. 18 and 19 illustrate examples of broadcasting contents according to an embodiment of the present disclosure.
Figure 19:
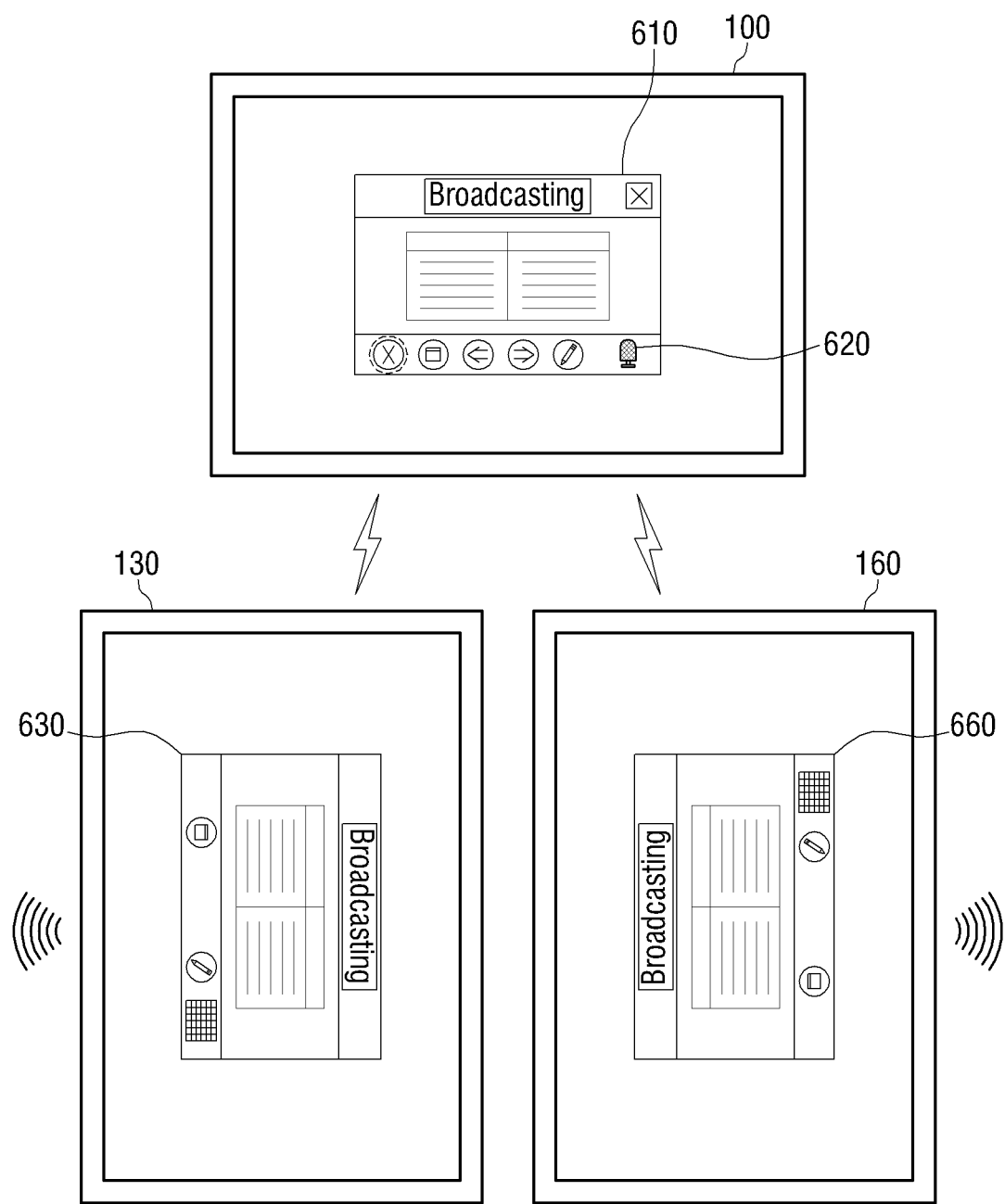

The host device 100, the first guest device 130, and the second guest device 160 may each have a microphone and a speaker. In this case, the host device 100 may broadcast audio contents to the guest devices 130 and 160. FIGS. 18 and 19 illustrate examples of broadcasting audio contents according to an embodiment of the present disclosure.

FIG. 18 illustrates an example of a user inputting audio contents to the host device 100 according to an exemplary embodiment. As illustrated in FIG. 18, a microphone icon 620 for activating an audio content input function is displayed on a host content window 610. Herein, the audio content input function refers to a function where if a user inputs voice using a microphone, the host device 100 stores the input voice. The microphone used for inputting voice may be provided integrally with the host device 100 or may be connected to the host device 100 via cable or wirelessly. Sound input via the microphone is not limited to a user's voice, and surrounding sound may also be input via the microphone.

The host device 100 may receive voice using a microphone and also receive audio contents from an external source (not shown) and external storage medium (not shown). The external source includes a server outside of the host device 100 and the external storage medium refers to a storage medium that can be coupled to the host device 100. Examples of such a storage medium includes a memory card, a memory stick, a flash memory, a hard disk, and an optic disk, etc., and each of the storage media may be provided in various forms.

FIG. 19 illustrates an example of audio content input to the host device and transmitted and output to guest devices.

As illustrated in FIG. 19, if a user inputs voice to the host device 100, the input voice is stored in the host device 100 and output to the guest devices 130 and 160. The guest devices 130 and 160 may output audio contents only when there is an input from a user via the guest devices 130 and 160 or the guest devices 130 and 160 may output audio contents automatically when the audio contents are transmitted from the host device. When audio contents are output using the guest devices 130 and 160, the guest devices 130 and 160 may be internal devices having a speaker or devices where a speaker is connected via cable or wirelessly.

In the embodiments described with reference to FIGS. 18 and 19, a user may input audio contents and listen to output audio contents using a headset where a speaker and a microphone are integrally formed. The headset is connected to the host device 100 or the guest devices 130 and 160 via cable or wirelessly.

Hereinafter, a process of ending broadcasting is described with reference to FIGS. 20 to 24.

Figure 20:
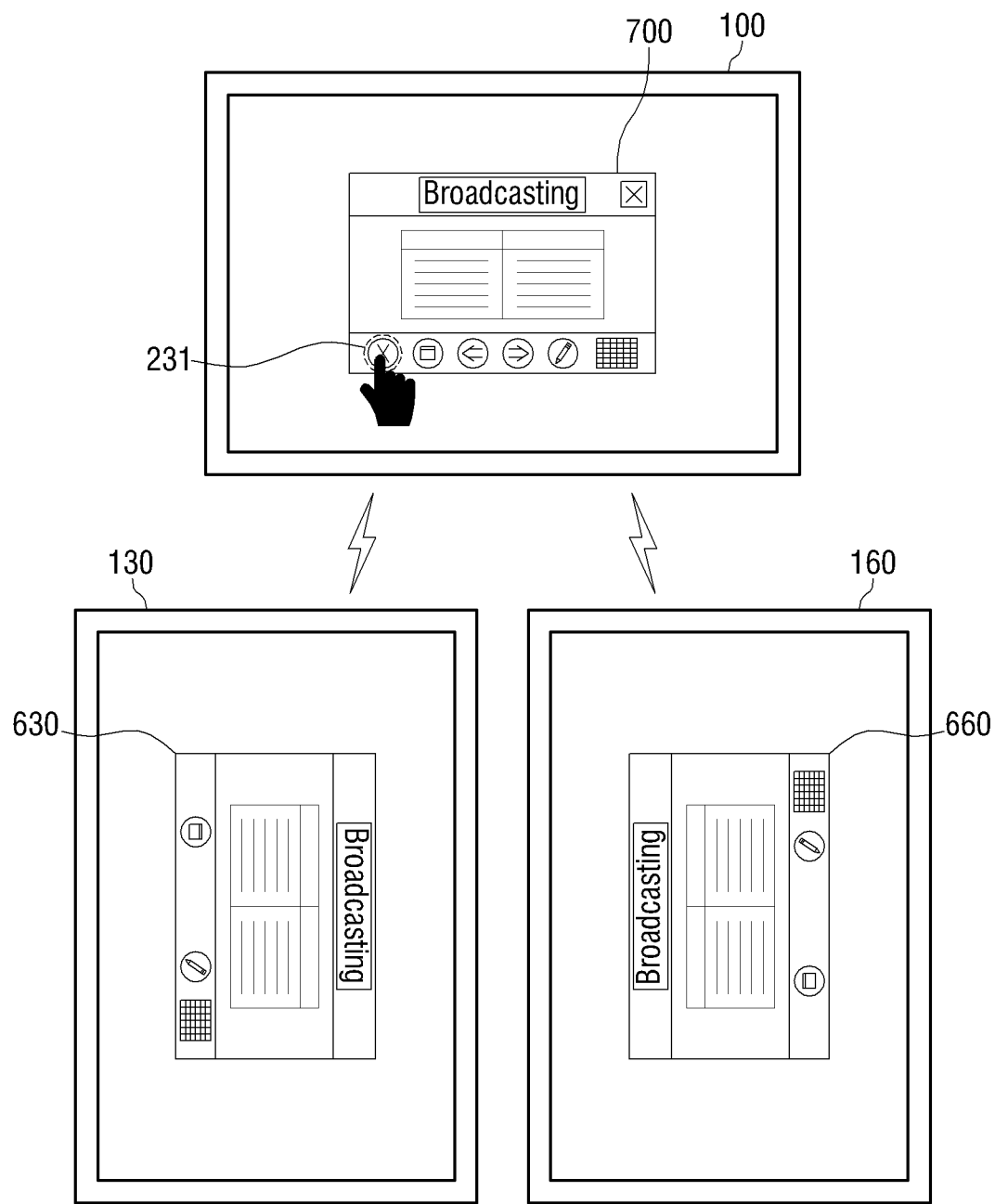
FIG. 20 illustrates an example of a user touching an icon for ending broadcasting according to an embodiment of the present disclosure.
Figure 21:
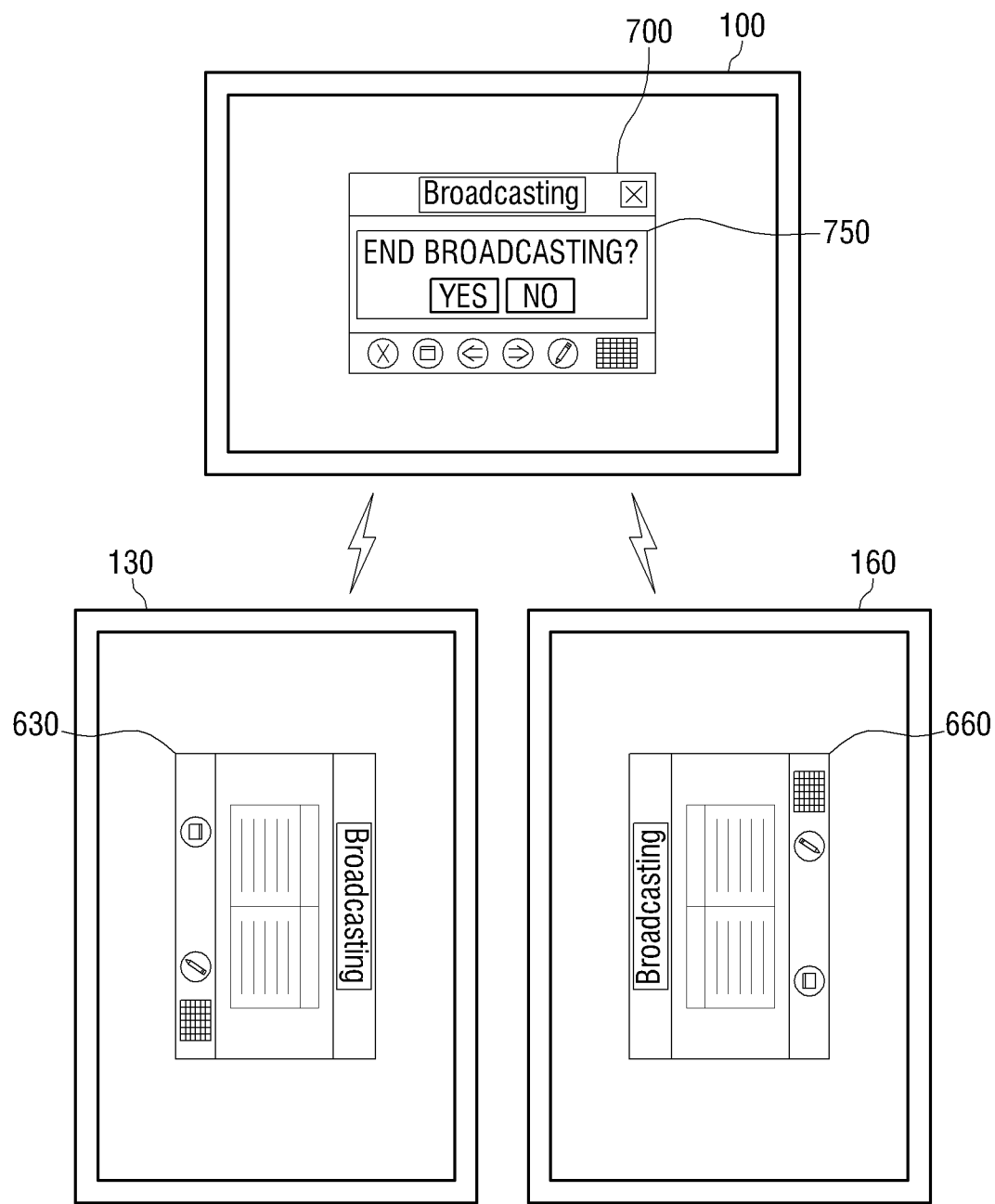
FIG. 21 illustrates a screen where a message to end broadcasting is displayed according to an embodiment of the present disclosure.
Figure 22:
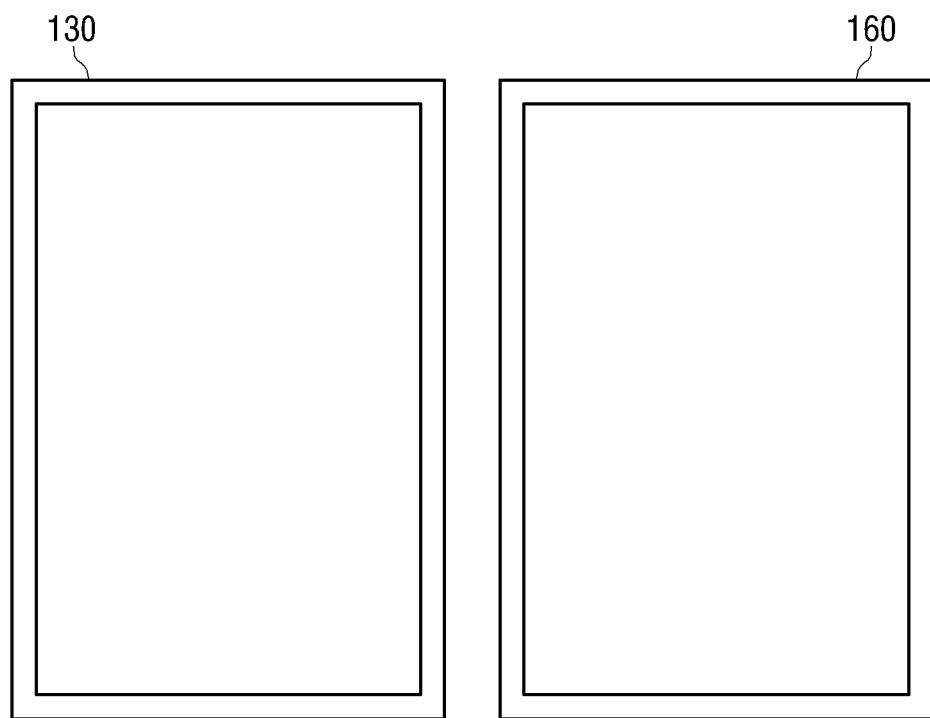
FIG. 22 illustrates an example of broadcasting ended according to an icon for ending broadcasting according to an embodiment of the present disclosure.

FIG. 20 illustrates an example of a user touching an icon for ending broadcasting according to an embodiment of the present disclosure; FIG. 21 illustrates a screen where a message to end broadcasting is displayed according to an embodiment of the present disclosure; FIG. 22 illustrates an example of broadcasting ended according to an icon for ending broadcasting according to an embodiment of the present disclosure.

As illustrated in FIG. 20, a user may use the broadcast end icon 231 in order to end broadcasting of contents. If a user touches the broadcast end icon 231, a message 750 for confirming termination of broadcasting is displayed as illustrated in FIG. 21. In this case, the broadcast end confirmation message 750 may be displayed if the end icon 231 is pointed using a pointing device or a separate selection button is pointed and then pressed. However, the display the broadcast end confirmation message 750 in FIG. 21 is only provided as an example and broadcast may be ended without displaying the broadcast end confirmation message 750 in accordance with embodiments of the present disclosure.

If a user selects 'Yes' in response to the broadcast end confirmation message 750 in FIG. 21, the broadcasting of the host device 100 is ended as illustrated in FIG. 22. Accordingly, as illustrated in FIG. 22, a host content window 705 of the host device 100 is changed to be in a state where contents are not broadcast (see the example described with reference to FIG. 2), and the first guest device 130 and the second guest device 160 do not display a guest content window any more.

Meanwhile, a user may end broadcasting using a close-window icon 710 of a host content window 700, which is explained in further detail with reference to FIGS. 23 and 24.

Figure 23:
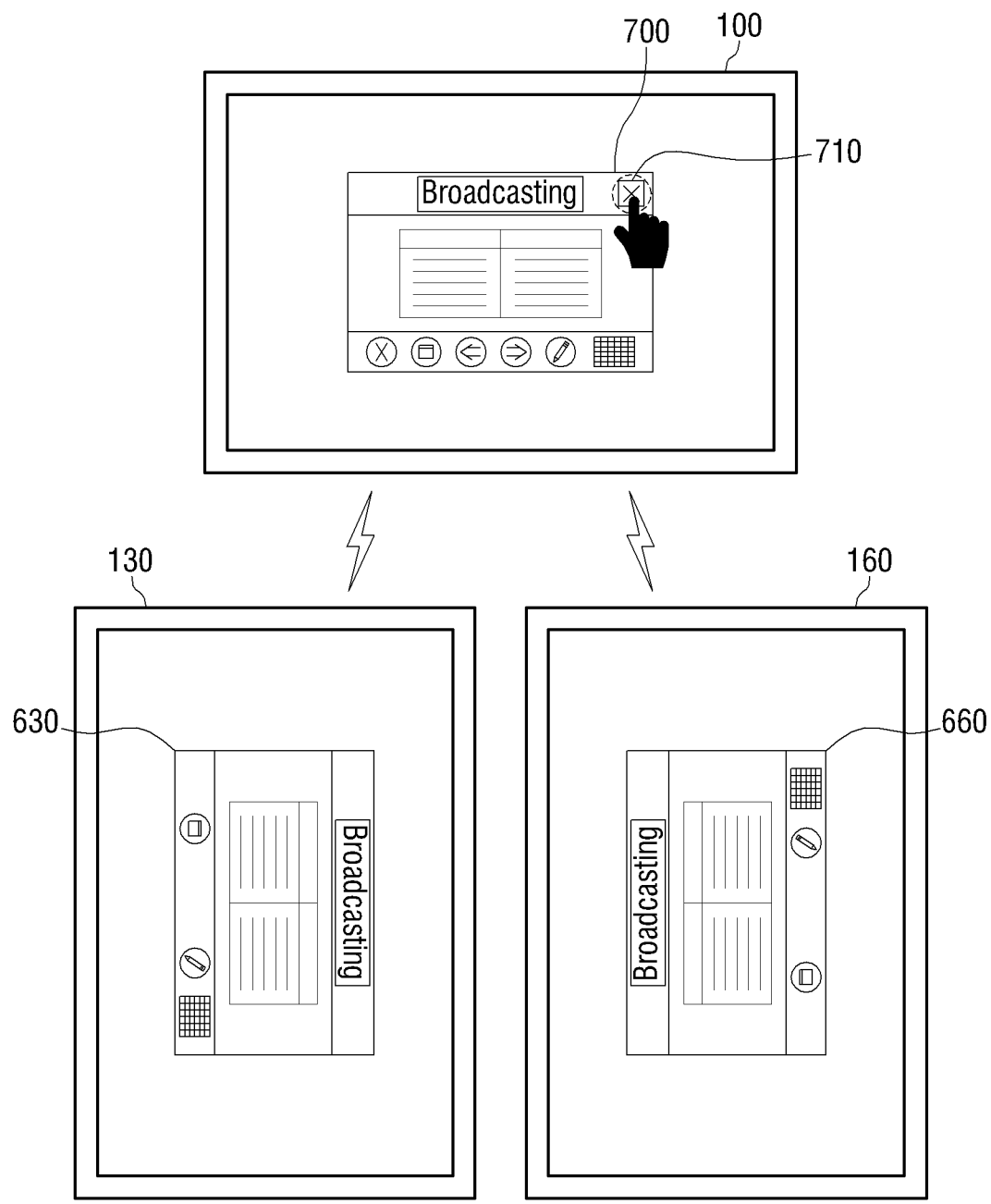
FIG. 23 illustrates an example of a user touching an icon for closing a host content window according to an embodiment of the present disclosure.

FIG. 23 illustrates an example of a user touching an icon for closing a host content window according to an embodiment of the present disclosure. FIG. 24 illustrates an example of broadcasting ended according to an icon for closing a host content window according to an embodiment of the present disclosure.

Figure 24:
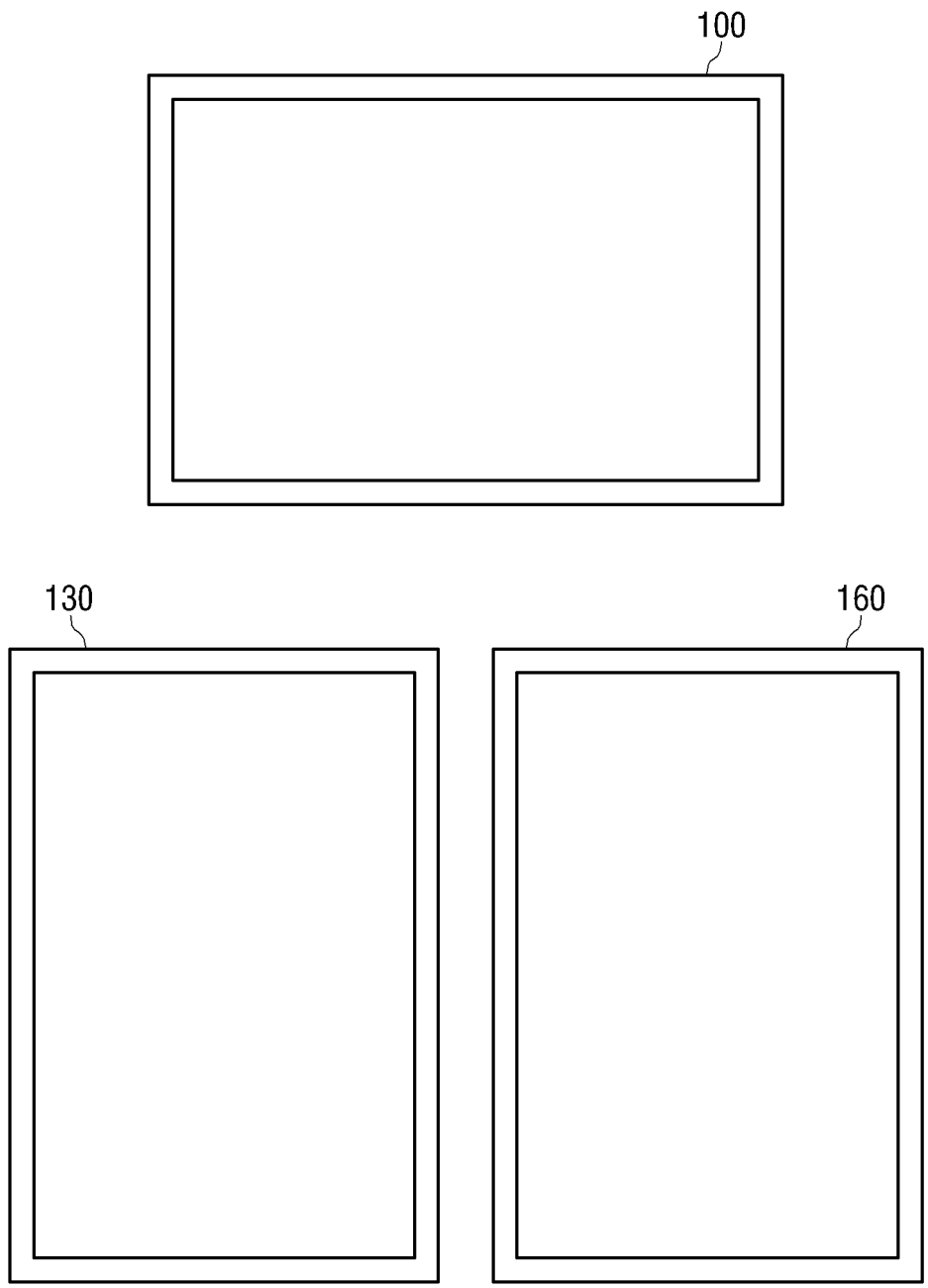
FIG. 24 illustrates an example of broadcasting ended according to an icon for closing a host content window according to an embodiment of the present disclosure.

As illustrated in FIG. 23, if a user touches the close-window icon 710 of the host content window 700, the host content window 700 displayed on the host device 100 disappears, as shown in FIG. 24. In addition, the first guest device 130 and the second guest device 160 no longer display a guest content window, as shown in FIG. 24.

Figure 25:
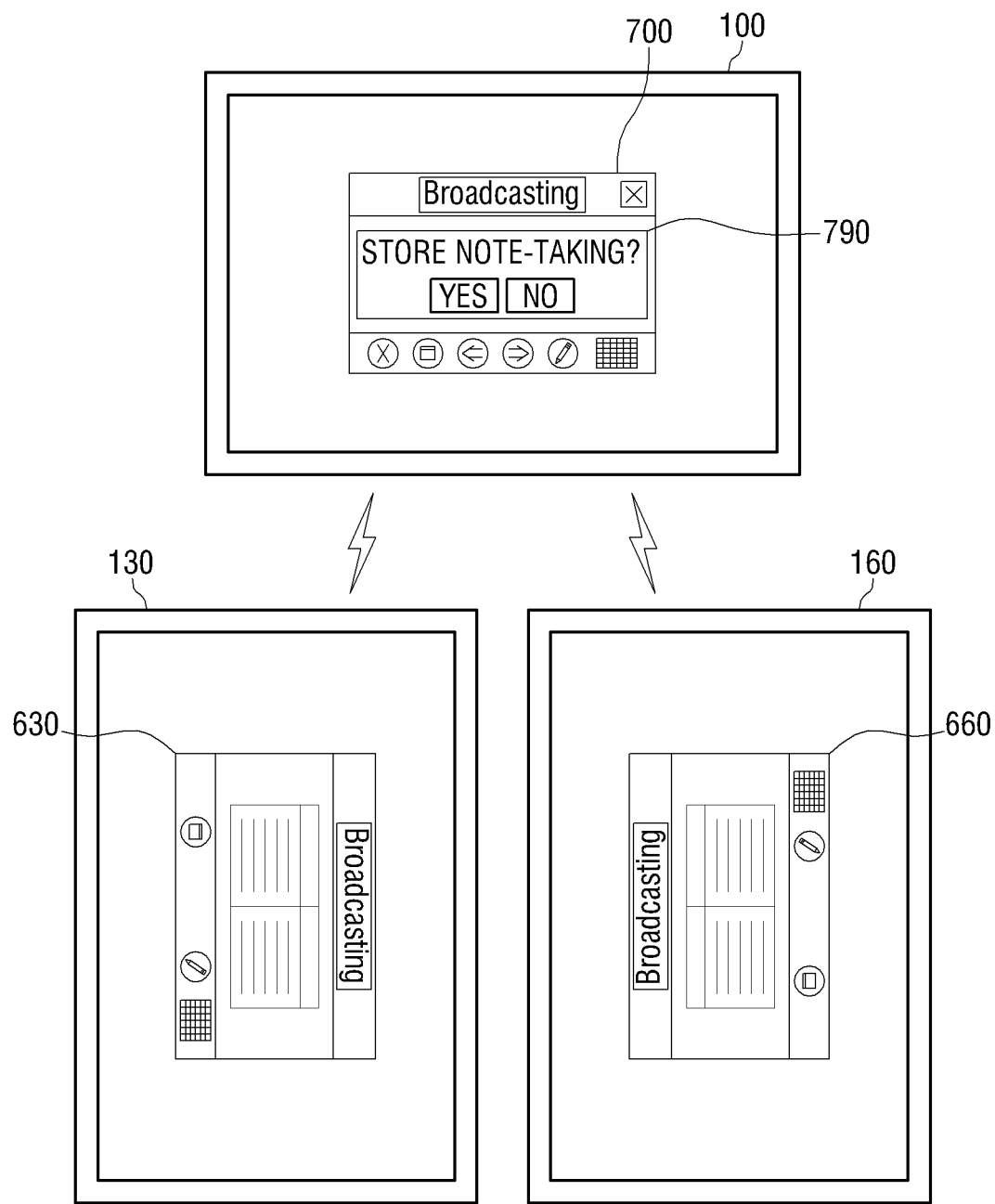
FIG. 25 illustrates a screen where a message to confirm storage of notes are displayed according to an embodiment of the present disclosure.

FIG. 25 illustrates a screen where a message to confirm storage of notes are displayed according to an embodiment of the present disclosure.

As illustrated in FIG. 25, if a user inputs a command to end broadcasting in the host device 100, the host device 100 may store notes that have been taken to the present moment.

Accordingly, if a user ends broadcasting as illustrated in FIG. 21 or FIG. 23, the host device 100 may display the note-taking storage confirmation message 790 as illustrated in FIG. 25. In addition, if a user selects 'Yes', the host device 100 stores all of the notes that have been taken to the present and ends broadcasting as illustrated in FIG. 24.

Hereinabove, examples of screen displays according to processes for broadcasting contents by the host device 100 to the guest devices 130 are 160 are described with reference to FIGS. 1 to 25. Hereinafter, a method of broadcasting contents by the host device 100 to the guest devices 130 and 160 is described in detail with reference to FIGS. 26 and 27.

Figure 26:
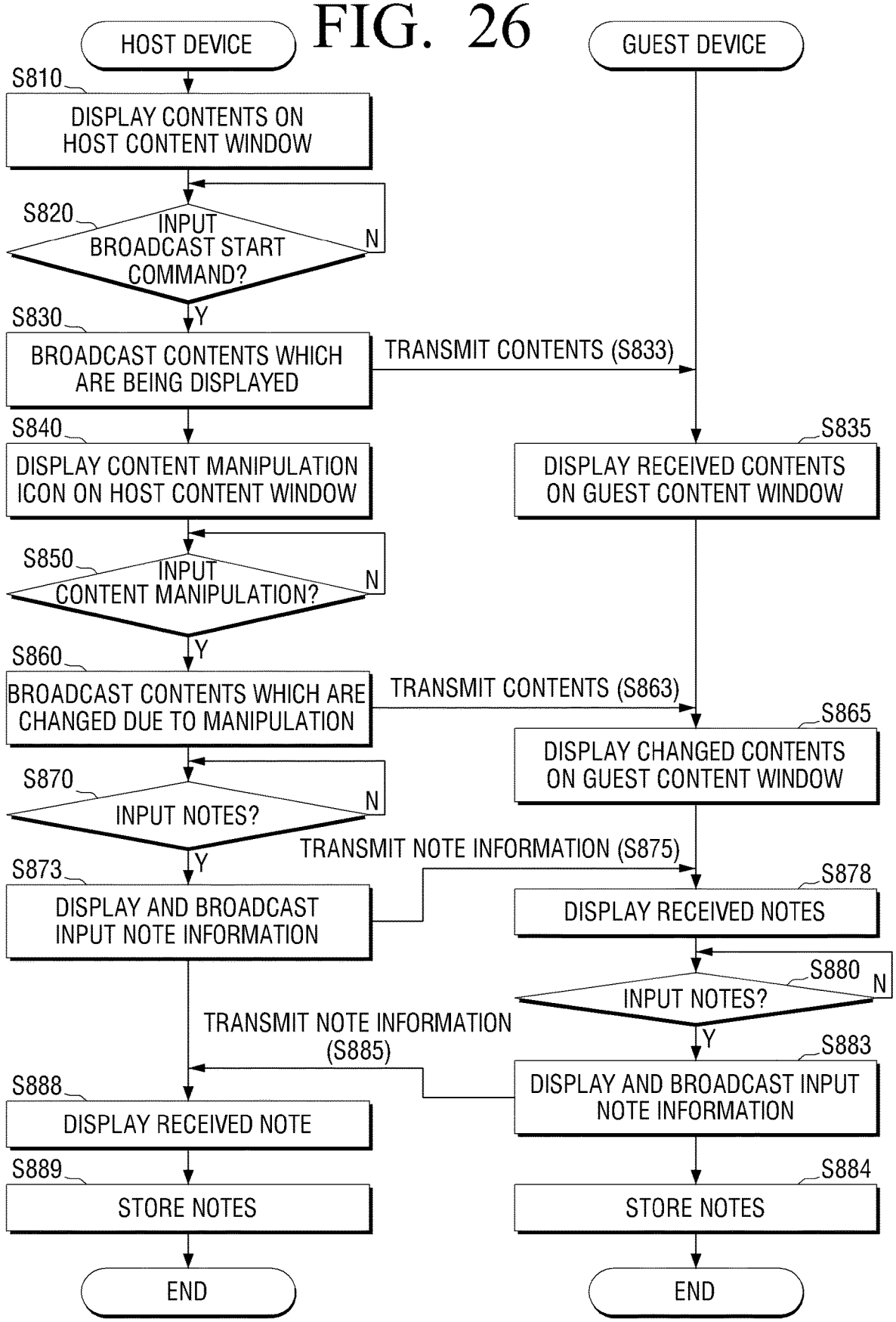
FIG. 26 is a flowchart illustrating a method for broadcasting contents of a host device and a guest device according to an embodiment of the present disclosure.

FIG. 26 is a flowchart illustrating a method for broadcasting contents of a host device and a guest device according to an embodiment of the present disclosure.

As illustrated in FIG. 26, the host device 100 displays contents on a host content window, in step S810. If a command to start broadcasting is input by a user, in step S820-Y, the host device 100 broadcasts the contents being displayed, in step S830. Subsequently, the contents are transmitted to the guest device 130 and 160, in step S833, and the guest device 130 and 160 display the received contents on a guest content window, in step S835.

The host device 100 displays a content manipulation icon on a host content window, in step S840. In other words, the host device 100 changes the form of a host content window from the form of FIG. 2 to the form of FIG. 3. Herein, the content manipulation icon refers to an icon for inputting commands for manipulation contents on a content window. Specifically, the content manipulation icon includes at least one of an icon for turning content pages forward and an icon for turning content pages backward.

The operation of starting broadcasting by the host device 100 and the guest devices 130 and 160 in steps S810 to S840 is also explained in detail hereinabove with reference to FIGS. 5 to 8.

Subsequently, if a user's manipulation of contents is input, in step S850-Y, the host device 100 broadcasts the contents manipulated by the user, in step S860.

Herein, the manipulation of contents means changing contents on the screen. For example, the manipulation of contents may represent changing a content file which is currently being displayed or changing a content page. In addition, the manipulation of contents may be performed by manipulating a content manipulation icon.

Subsequently, the changed contents are transmitted to a guest device, in step S863, and the guest devices 130 and 160 display the changed contents on a guest content window, in step S865. Through the above process, the host device 100 and the guest devices 130 and 160 may share the same contents.

If a user's note-taking is input via a touch screen of the host device 100, in step S870-Y, the host device 100 displays the input note-taking on the screen and broadcast the note-taking information, in step S873. Subsequently, the note-taking information is transmitted to the guest devices 130 and 160, in step S875 and the guest devices 130 and 160 display the received note-taking of the user on a guest content window, in step S878.

If a user's note-taking is input via a touch screen of the guest devices 130 and/or 160, in step S880-Y, the guest devices 130 and 160 display the input note-taking on a screen and broadcast the note-taking information, in step S883. The guest devices 130 and 160 also store presently taken notes, in step S884).

After storing the notes, the note-taking information is transmitted to the host device 100, in step S885, and the host device 100 displays the received note-taking on a host content window, in step S888. The host device 100 stores the received presently taken notes, in step S889.

In this case of storing notes by the host device 100, the user's notes input to the guest devices 130 and 160 and the user's notes input to the host device 100 may be displayed in different colors from each other. As such, if different colors are used for each device, each user may easily distinguish who has taken particular notes.

In addition, as described above with regard to FIG. 17, a separate application may be displayed on an area outside of a display area of a content window on the host device 100 and the guest devices 130 and 160. In other words, the host device 100 and the guest device 130 and 160 may perform multi-tasking through such a display arrangement.

While the host device 100 and the guest devices 130 and 160 broadcast contents, a broadcast indicator indicating that contents are being broadcast is displayed on a content window.

Through the above-described process, the host device 100 and the guest devices 130 and 160 may share the same contents.

Meanwhile, a single device may alternately perform the function of a host that broadcasts contents and may perform the function of a guest that receives and displays contents. As such, the process of devices being allocated as hosts and guests is described hereinafter.

Figure 27:
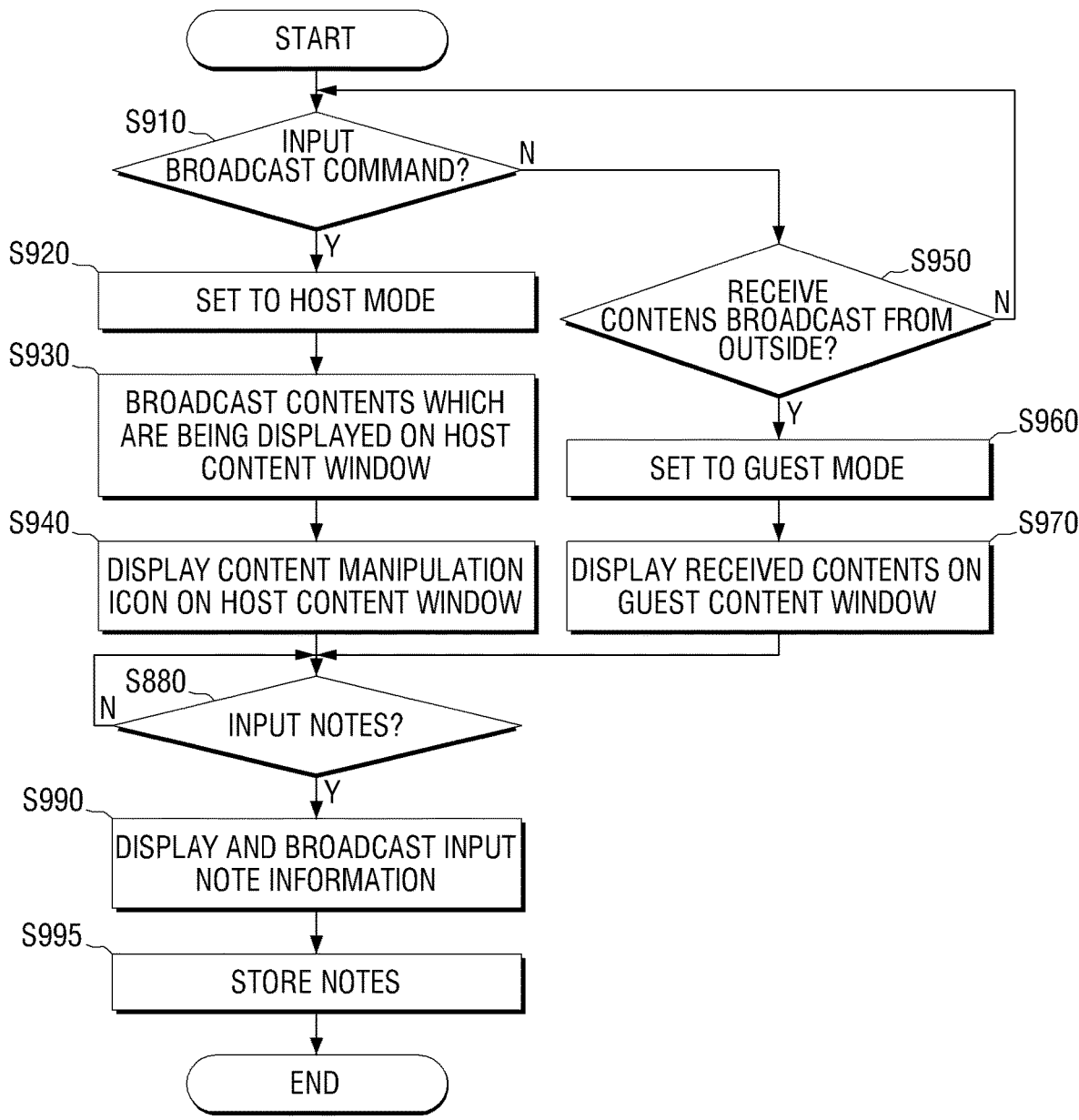
FIG. 27 is a flowchart to explain a method for setting a device to be in a host mode or in a guest mode according to an embodiment of the present disclosure.

FIG. 27 is a flowchart to explain a method for setting a device to be in a host mode or in a guest mode according to an embodiment of the present disclosure.

Herein, the host mode is a mode where the device is set to function as the host device 100 and the guest mode is a mode where the device is set to function as a guest device 130 or 160.

Initially, a device determines whether a broadcast command is input, in step S910. If the broadcast command is input, in step S910-Y, the device sets a mode to a host mode, in step S920, i.e., the device performs the function of the host device 100 that broadcasts contents.

Accordingly, the device broadcasts contents that are currently displayed on a host content window and the device displays a content manipulation icon on a host content window, in step S940. More specifically, the device changes a host content window from the form illustrated in FIG. 2 to the form illustrated in FIG. 3.

Meanwhile, the device determines whether contents broadcast from another device are received while a broadcast command is not input, in steps S910-N and S950. If contents broadcast from another device are received, in step S950-Y, the device sets a mode to a guest mode, in step S960 and the device displays the received contents on a guest content window, in step S970.

Meanwhile, if a user's notes are input via a touch screen, in step S980-Y, the device displays the input notes on a screen and broadcasts information regarding the input notes, in step S990. More specifically, the device broadcasts a user's notes whenever the notes are input regardless of a current mode of the device (i.e., regardless of whether the device is in a host mode or a guest mode). The device also stores presently-taken notes, in step S995. Through the above-described process, the device may function as a host or a guest when sharing contents.

Figure 28:
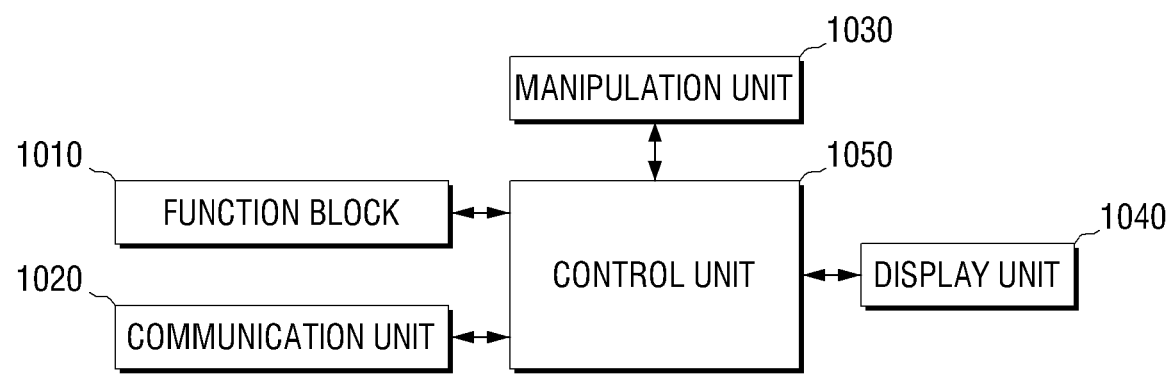
FIG. 28 is a block diagram illustrating a configuration of a device according to an embodiment of the present disclosure.

FIG. 28 is a block diagram illustrating a configuration of a device according to an embodiment of the present disclosure.

As illustrated in FIG. 28, a device according to an embodiment of the present disclosure includes a function block 1010, a communication unit 1020, a manipulation unit 1030, a display unit 1040, and a control unit 1050.

The function block performs original functions of a device. For example, if a device is a desktop, the function block 1010 performs desktop functions, and if a device is a smart board, the function block 1010 performs the function of the smart board necessary for a digital conference. If a device is another type of electronic device (such as a mobile phone, electronic book, etc.), the function block 1010 performs the corresponding original functions of the electronic device.

The communication unit 1020 is connected to an external device via cable or wireless so as to communicate with the external device. For example, the communication unit 1020 may communicate with an external device wirelessly via wireless LAN, Bluetooth®, or Zigbee®. Alternatively, the communication unit 1020 may communicate with an external device via cable such as RS-232, Universal Serial Bus (USB), wireless LAN, and High-Definition Multimedia Interface (HDMI).

The manipulation unit 1030 receives input for a specific command through a user's manipulation. For example, the manipulation unit 130 may include button, wheel, a touch screen, etc. The manipulation unit 1030 may also include a pointing device (not shown). In certain cases, such as when the manipulation unit 1030 includes a pointing device, part of the manipulation unit 1030 may not be integrally formed with the device.

The pointing device may mounted with an infrared light emitting unit, an infrared light sensing unit, an acceleration sensor, and a gyro sensor and may calculate a user's input into a coordinates regarding a location pointed by the user. If an infrared light emitting unit is mounted on a pointing device, an infrared light sensing unit will be mounted on the device, and if an infrared light sensing unit is mounted on the pointing device, an infrared light emitting unit will be mounted on the device. In addition, if a laser generating unit is mounted on a pointing device, a laser sensing unit will be mounted on the host device 100 or the guest devices 130 and 160. The laser sensing unit may be configured as a camera or other devices that can recognize lasers generated from a laser generating unit. In this case, a pointing device including a laser generating unit may be a laser pointer.

The display unit 1040 displays an input image. Specifically, the display unit 1040 displays contents on a content window. Three examples of contents windows are described herein with reference to FIGS. 2 to 4.

Referring back to FIG. 28, the control unit 1050 performs operations described with reference to FIG. 27 so as to control the device to function as a host device or a guest device. More specifically, if a broadcast start command is input through a manipulation unit, the control unit 1050 sets the mode of the device to a host mode so as to broadcast contents that are being displayed on a content window. However, if contents broadcast from an external device are received from the communication unit 1020, the control unit 1050 sets the mode of the device to a guest mode so as to display the received contents on a content window.

In addition, if the mode of a device is set to a host mode, the control unit 1050 controls to display an icon for inputting a command regarding manipulation of contents on a content window. In this case, the control unit 1050 controls to display a host content window described with reference to FIG. 3.

However, if a device is set to a guest mode, the control unit 1050 controls the device not to display an icon for inputting a command regarding manipulation of contents on a content window. In this case, the control unit 1050 controls to display a guest content window illustrated in FIG. 4.

Alternatively, if a device is set to a host mode, the control unit 1050 controls the communication unit 1020 to broadcast contents which are being displayed on a content window and to display at least one icon for inputting a command regarding manipulation of contents on a content window. If at least one icon is manipulated, the control unit 1050 controls the communication unit 1020 to broadcast contents that are changed in accordance with the manipulation.

In addition, the control unit 1050 controls other functions that are described herein-above with reference to FIGS. 1 to 24.

Meanwhile, a device according to an embodiment of the present disclosure may be any device that has a display. For example, the device may be a desktop, a smart board, a television (TV), a notebook computer, etc. In addition, the device may be a mobile device such as a mobile phone, an electronic book, a Motion Picture Experts' Group Audio Layer 3 (MP3) player, an electronic notepad, an electronic album, etc.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A device comprising:
a display; and
one or more processors configured to:
control the display to display a first screen of a file shared with an external device in a first window and a second screen of an application that is not shared with the external device in a second window;
based on a first user input to edit content of the file being input via a user interface of the device, edit the content of the file displayed on the first window by changing a display of the content of the file according to the first user input and share the edited content of the file with the external device while the second screen is displayed in the second window and while the external device is in a first mode in which viewing edits to the content of the file by user inputs to the device is permitted and editing the content of the file by user inputs to the external device is not activated;
based on a second user input being input to control the application, control the application according to the second user input while the edited content of the file shared with the external device is displayed in the first window;
based on a third user input to edit the content of the file being input via a user interface of the external device after a mode of the external device is changed, by user input to an icon for changing from the first mode to a second mode via the user interface of the external device, from the first mode to the second mode in which editing the content of the file by user inputs to the external device is activated, receive from the external device information corresponding to the third user input to edit the content of the file; and
based on the information corresponding to the third user input to edit the content of the file, edit the content of the file displayed on the first window by changing a display of the content of the file according to the third user input,
wherein the content edited based on the first user input and the content edited based on the third user input are identified by different colors,
wherein location information corresponding to the third user input is received separately from the information corresponding to the third user input, and
wherein the first window includes an icon selectable by a user to select between a device first mode in which viewing edits to the content of the file by user inputs to the device is permitted and editing the content of the file by user inputs to the device is not activated, and a device second mode in which editing the content of the file by user inputs to the device is activated.

2. The device as claimed in claim 1, wherein the one or more processors is further configured to display the first window in an area on the display separated from an area where the second window is displayed on the display.

3. The device as claimed in claim 1, wherein, based on a user input being input to select an icon for sharing the file via the user interface of the device, the one or more processors is further configured to transmit information on sharing the file to the external device.

4. The device as claimed in claim 1, wherein the first user input comprises text.

5. The device as claimed in claim 1, wherein a color of the content edited based on the third user input is green.

6. The device as claimed in claim 1, wherein the first user input is a text input to add text to the content of the file, and the third user input is a drawing input to add a drawing to the content of the file.

7. A method for controlling a device, the method comprising:
displaying, on a display of the device, a first screen of a file shared with an external device in a first window and a second screen of an application that is not shared with the external device in a second window;
based on a first user input to edit content of the file being input via a user interface of the device, editing the content of the file displayed on the first window by changing a display of the content of the file according to the first user input and sharing edited content of the file with the external device while displaying the second screen in the second window and while the external device is in a first mode in which viewing edits to the content of the file by user inputs to the device is permitted and editing the content of the file by user inputs to the external device is not activated;
based on a second user input being input to control the application, controlling the application according to the second user input while displaying the edited content of the file shared with the external device in the first window;
based on a third user input to edit the content of the file being input to an icon for changing from the first mode to a second mode via a user interface of the external device after a mode of the external device is changed, by user input via the user interface of the external device, from the first mode to the second mode in which editing the content of the file by user inputs to the external device is activated, receiving from the external device information corresponding to the third user input to edit the content of the file; and
based on the information corresponding to the third user input to edit the content of the file, editing the content of the file displayed on the first window by changing a display of the content of the file according to the third user input,
wherein the content edited based on the first user input and the content edited based on the third user input are identified by different colors,
wherein location information corresponding to the third user input is received separately from the information corresponding to the third user input, and
wherein the first window includes an icon selectable by a user to select between a device first mode in which viewing edits to the content of the file by user inputs to the device is permitted and editing the content of the file by user inputs to the device is not activated, and a device second mode in which editing the content of the file by user inputs to the device is activated.

8. The method as claimed in claim 7, wherein the first user input comprises text.

9. The method as claimed in claim 7, wherein the first window is displayed in an area on the display separated from an area where the second window is displayed on the display.

10. The method as claimed in claim 7, further comprising:
based on a user input to select an icon for sharing the file, transmitting information on sharing the file to the external device.

11. The method as claimed in claim 7, wherein a color of the content edited based on the third user input is green.

12. The method as claimed in claim 7, wherein the first user input is a text input to add text to the content of the file, and the third user input is a drawing input to add a drawing to the content of the file.

13. A device comprising:
a display; and
one or more processors configured to:
control the display to display a first screen of a file shared by an external device in a first window and a second screen of an application that is not shared by the external device in a second window, wherein the first screen is displayed in a first mode in which editing content of the file by user inputs to the device is not activated;
based on a first user input to edit the content of the file being input via a user interface of the external device, receive from the external device information corresponding to the first user input to edit the content of the file;
control the display to display the content of the file edited by the first user input in the first window based on the information corresponding to the first user input to edit the content of the file;
based on a second user input being input via a user interface of the device to an icon for changing a mode from the first mode to a second mode in which editing the content of the file by user inputs to the device is activated, change the mode from the first mode to the second mode;
based on a third user input to edit the content of the file being input via the user interface of the device, edit the content of the file displayed on the first window according to the third input and share the edited content of the file with the external device while the second screen is displayed in the second window; and
based on a fourth user input being input to control the application, control the application according to the fourth user input while the edited content of the file shared with the external device is displayed in the first window,
wherein the one or more processors are configured to transmit, toward the external device, location information of the third user input relative to the first screen, and
wherein the location information of the third user input is transmitted in a separate file from the edited content based on the third user input
wherein location information corresponding to the first user input is separately received from the information corresponding to the first user input, and
wherein the external device is switchable, via an icon selectable by a user to select between a device first mode and a device second mode, between the device first mode in which viewing edits to the content of the file by user inputs to the device is permitted and editing the content of the file by user inputs to the external device is not activated, and the device second mode in which editing the content of the file by user inputs to the external device is activated.

14. The device as claimed in claim 13, wherein the icon is located on a border region of the first window surrounding the first screen.

15. The device as claimed in claim 13, wherein the first window comprises another icon for enabling a voice input, from a user, relative to the content of the first window.

16. The device as claimed in claim 15, wherein the other icon includes an image of a microphone.

17. The device as claimed in claim 13, wherein the first user input is a text input to add text to the content of the file, and the third user input is a drawing input to add a drawing to the content of the file.

\* \* \* \* \*